United States Patent
Sugawara et al.

(10) Patent No.: US 10,589,779 B2
(45) Date of Patent: Mar. 17, 2020

(54) ELECTRIC POWER STEERING APPARATUS

(71) Applicant: NSK LTD., Tokyo (JP)

(72) Inventors: Takayoshi Sugawara, Tokyo (JP);
Yousuke Imamura, Tokyo (JP);
Masahiro Maeda, Tokyo (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 218 days.

(21) Appl. No.: 15/536,411

(22) PCT Filed: Dec. 21, 2015

(86) PCT No.: PCT/JP2015/085675
§ 371 (c)(1),
(2) Date: Jun. 15, 2017

(87) PCT Pub. No.: WO2016/104427
PCT Pub. Date: Jun. 30, 2016

(65) Prior Publication Data
US 2017/0349208 A1    Dec. 7, 2017

(30) Foreign Application Priority Data

Dec. 26, 2014 (JP) ................................ 2014-265960

(51) Int. Cl.
*B62D 6/00* (2006.01)
*B62D 5/04* (2006.01)

(52) U.S. Cl.
CPC ........... *B62D 6/008* (2013.01); *B62D 5/0463* (2013.01); *B62D 5/0472* (2013.01)

(58) Field of Classification Search
CPC ..... B62D 6/008; B62D 5/0463; B62D 5/0472
(Continued)

(56) References Cited

U.S. PATENT DOCUMENTS

2008/0208411 A1    8/2008  Broecker
2010/0211263 A1*   8/2010  Lindenstruth ........ B62D 5/0472
                                                       701/41
(Continued)

FOREIGN PATENT DOCUMENTS

EP    2221236 A1 *  8/2010  ........... B62D 5/0463
EP    2221236 A1    8/2010
(Continued)

OTHER PUBLICATIONS

International Search Report of PCT/JP2015/085675 dated Mar. 8, 2016 [PCT/ISA/210].

*Primary Examiner* — Jacob D Knutson
(74) *Attorney, Agent, or Firm* — Sughrue Mion, PLLC

(57) ABSTRACT

An electric power steering apparatus includes: a current command value determining section that determines a current command value based on steering torque and vehicle speed; a vibration extracting filter that extracts a first vibration component having a predetermined amplitude and first predetermined frequency range depending on motor angular velocity; a vibration extracting section that extracts a second vibration component having a second predetermined frequency range depending on motor angular acceleration; a first compensation value calculating section that calculates a first vibration suppression compensation value based on the first vibration component extracted by the vibration extracting filter; and a second compensation value calculating section that calculates a second vibration suppression compensation value based on the second vibration component; and suppresses vibrations of the motor by feeding back the first vibration suppression compensation value and the second vibration suppression compensation value calculated to the current command value.

11 Claims, 14 Drawing Sheets

(58) Field of Classification Search
USPC .................................... 180/443, 444, 446
See application file for complete search history.

(56) References Cited

U.S. PATENT DOCUMENTS

| | | | | |
|---|---|---|---|---|
| 2015/0088381 A1* | 3/2015 | Imamura | ............. | B62D 5/0472 |
| | | | | 701/41 |
| 2018/0170422 A1* | 6/2018 | Yoshida | ................ | B62D 5/046 |

FOREIGN PATENT DOCUMENTS

| | | | | |
|---|---|---|---|---|
| JP | 60-161257 | A | | 8/1985 |
| JP | 08-175404 | A | | 7/1996 |
| JP | 11-105729 | A | | 4/1999 |
| JP | 2006-188183 | A | | 7/2006 |
| JP | 2006188183 | A | * | 7/2006 |
| JP | 2006188183 | A | | 7/2006 |
| JP | 2008-092633 | A | | 4/2008 |
| JP | 2009-090953 | A | | 4/2009 |
| JP | 2009090953 | A | * | 4/2009 |
| JP | 2011-121383 | A | | 6/2011 |
| JP | 2011121383 | A | * | 6/2011 |
| JP | 2013-233907 | A | | 11/2013 |
| WO | 2009/078074 | A1 | | 6/2009 |

\* cited by examiner

IN THE CASE OF PATENT DOCUMENT 4

INT THE CASE OF APPLYING VIBRATION EXTRACTING FILTER

ELECTRIC POWER STEERING APPARATUS

CROSS REFERENCE TO RELATED APPLICATIONS

This application is a National Stage of International Application No. PCT/JP2015/085675, filed Dec. 21, 2015, claiming priority based on Japanese Patent Application No. 2014-265960, filed Dec. 26, 2014, the contents of all of which are incorporated herein by reference in their entirety.

TECHNICAL FIELD

The present invention relates to an electric power steering apparatus that provides a steering system of a vehicle with an assist force generated by a motor, and in particular to an electric power steering apparatus that is capable of efficiently suppressing a torque ripple and simultaneously minimizing steering performance degradation such as an increase in a steering wheel's inertia feeling by extracting a torque ripple vibration component depending on an electric power steering state parameter based on a motor angular velocity and a motor angular acceleration and feeding back a vibration suppression compensation value calculated based on the extracted vibration component or a vibration suppression compensation value calculated based on the extracted vibration component and electric power steering state parameter sensitive gains for changing a proportion of vibration suppression compensation to a control system.

BACKGROUND ART

An electric power steering apparatus which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus performs a feedback control of a motor current. The feedback control adjusts a voltage supplied to the motor so that a difference between a current command value and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft, a handle shaft) 2 connected to a steering wheel 1 is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1 and a steering angle sensor 14 for detecting a steering angel θ, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist control based on a steering torque Tr detected by the torque sensor 10 and a vehicle speed Vel detected by a vehicle speed sensor 12, and controls a current supplied to the motor 20 for EPS based on a voltage control command value Vref obtained by performing compensation and so on with respect to the current command value.

Further, the steering angle sensor 14 is not indispensable and may not be provided, and it is possible to obtain the steering angle from a rotation sensor such as a resolver connected to the motor 20.

A controller area network (CAN) 40 exchanging various information of a vehicle is connected to the control unit 30, and it is also possible to receive the vehicle speed Vel from the CAN 40. Further, it is also possible to connect a non-CAN 41 exchanging a communication, analog/digital signals, a radio wave or the like except the CAN 40 to the control unit 30.

The control unit 30 mainly comprises a CPU (including an MPU and an MCU), and general functions performed by programs within the CPU are shown in FIG. 2.

Functions and operations of the control unit 30 will be described with reference to FIG. 2. As shown in FIG. 2, the steering torque Tr detected by the torque sensor 10 and the vehicle speed Vel from the vehicle speed sensor 12 are inputted into a current command value calculating section 101, and a current command value Iref0 is calculated by means of an assist map. The calculated current command value Iref0 is inputted into a maximum output limiting section 102 and an output is limited based on an overheat protection condition or the like in the maximum output limiting section 102. A current command value Iref whose maximum output is limited, is inputted into a subtracting section 103. Hereinafter, a section comprised of the current command value calculating section 101 and the maximum output limiting section 102 is referred to as a current command value determining section 108.

Moreover, with respect to the calculation of the current command value Iref0 performed in the current command value calculating section 101, it is also possible to calculate the current command value Iref0 by using not only the steering torque Tr and the vehicle speed Vel but also the steering angel θ.

The subtraction section 103 calculates a deviation ΔI (=Iref−Im) between the current command value Iref and a motor current Im of the motor 20 that is fed back, the deviation ΔI is controlled by a current control section 104 such as a proportional and integral (PI) control or the like, the controlled voltage control command value Vref is inputted into a pulse width modulation (PWM) control section 105, where the duty ratio is calculated, and in accordance with a PWM signal PS of which the duty ratio is calculated, the motor 20 is driven through a motor driving circuit 106. The motor current Im applied to the motor 20 is detected by a motor current detecting circuit 107, and the detected motor current Im is inputted into the subtracting section 103 to be fed back.

A bridge circuit that bridge-connects semiconductor switching elements (FETs) and the motor, is used in the motor driving circuit 106 that controls the motor current by means of the voltage control command value Vref and drives the motor 20. The motor driving circuit (inverter) 106 that is configured so as to control the motor current by ON/OFF-controlling the semiconductor switching elements in accordance with the duty ratio of the PWM signal determined based on the voltage control command value Vref, is used.

Generally, since the electric power steering apparatus is a so-called human-machine interface mechanism that directly and easily transmits the feel to a steering operator among automobile parts, the torque ripple caused by the motor and mechanical mechanism is took up as a problem of steering feeling performance. In particular, since floor vibration that is caused by the torque ripple caused by the motor and mechanical mechanism and occurs due to vehicle eigenvalue excitation also relates to the problem of a vehicle system's operating noise, it becomes a major problem. When friction in the reduction gears is small, a damping effect that is exerted when the friction is large is not expected, and an influence of vibration caused by the torque ripple or the like becomes larger.

However, since factors of the torque ripple range widely, if taking measures against torque ripple according to factor, there is a problem that it is not efficient.

As solutions for solving such a problem, for example, there are Japanese Unexamined Patent Publication No. S60-161257A (Patent Document 1), Japanese Unexamined Patent Publication No. 2006-188183 A (Patent Document 2), Japanese Unexamined Patent Publication No. 2009-090953 A (Patent Document 3), and WO 2009/078074 (Patent Document 4).

A vibration extraction method of "vehicle motion control apparatus" disclosed in Patent Document 1 is a configuration that extracts a vibration component having a specific (an arbitrary) frequency range based on a value (a steering angle) of a sensor for detecting vehicle behaviors by means of Fourier transform and suppresses vibrations by changing control parameters depending on the extracted vibration component having the arbitrary frequency range.

However, since a configuration for realizing Fourier transform is especially complicated, as a result, making heavy use of microcomputer resource, hence it is difficult to say that the vibration extraction method of Patent Document 1 is an efficient method. Further, in changing the control parameters, there is a problem that which parameter should be changed and the confirmation of trade-off matter with other performances tends to become very complicated.

A vibration extraction method of "electric power steering apparatus" disclosed in Patent Document 2 is a configuration that extracts a vibration component having an arbitrary intended frequency range based on a difference between a vibration center value calculated by performing a moving average with respect to a steering torque and a value obtained by extracting a specific vibration frequency by a band-pass filter with respect to the steering torque and suppresses vibrations by changing control parameters depending on the extracted vibration component having the arbitrary frequency range.

However, also in the vibration extraction method of Patent Document 2, in changing the control parameters, there is a problem that which parameter should be changed and the confirmation of trade-off matter with other performances tends to become very complicated.

A vibration extraction method of "electric power steering apparatus" disclosed in Patent Document 3 is a configuration that extracts a specific frequency component (14~16 Hz) corresponding to a steering system's vibration caused by the application of an inverse input stress by performing a band-pass filter process and a root mean square (RMS) calculation with respect to a steering angle (a pinion angle), obtains an effective value of the extracted frequency component, and changes control parameters depending on a value (a power spectrum) after performing a low-pass filter process with respect to the obtained effective value.

However, since the electric power steering apparatus can not specify a steering pattern of a steering operator, in the case that a steer-inputted steering frequency is synchronized with the above specific frequency range (14~16 Hz), there is a possibility that a steering component (the steering frequency) inputted by the steering operator with the intention exists in the above specific frequency range. Therefore, according to the vibration extraction method of Patent Document 3, at the time of such a steering pattern, a problem that the compensation works in a direction that blocks that steering pattern and there is a possibility of being accompanied by uncomfortable feeling occurs.

Further, as with Patent Document 1, also in the vibration extraction method of Patent Document 3, in changing the control parameters, there is a problem that which parameter should be changed and the confirmation of trade-off matter with other performances tends to become very complicated.

A vibration extraction method of "electric power steering apparatus" disclosed in Patent Document 4 is a method of utilizing a matter that amplitudes of the vibration components such as the torque ripple and a road surface disturbance are smaller than the amplitude of the steering component of the steering operator, and concretely is a configuration that extracts a vibration component (a small vibration component) having an arbitrary amplitude based on a difference between an output obtained by performing a hysteresis function process having a hysteresis width corresponding to the vibration component having the arbitrary amplitude with respect to a dynamic state parameter (a motor's rotational velocity or a steering torque) of an electric power steering apparatus or an automobile and the above dynamic state parameter, and calculates a vibration compensation value (a vibration suppression current) depending on the extracted vibration component to configure a feedback control loop.

THE LIST OF PRIOR ART DOCUMENTS

Patent Documents

Patent Document 1: Japanese Unexamined Patent Publication No. S60-161257 A
Patent Document 2: Japanese Unexamined Patent Publication No. 2006-188183 A
Patent Document 3: Japanese Unexamined Patent Publication No. 2009-090953 A
Patent Document 4: WO 2009/078074
Patent Document 5: Japanese Unexamined Patent Publication No. 2013-233907 A

SUMMARY OF THE INVENTION

Problems to be Solved by the Invention

However, for example, when running at a high speed, since it is necessary to take a micro line, sometimes a steering operator slightly steers the steering wheel. Since the amplitude at the time of such a steering pattern (hereinafter referred to as "a micro line-taking steering pattern") is very tiny, according to the vibration extraction method of Patent Document 4, the amplitude at the time of the micro line-taking steering pattern becomes within the hysteresis width, it leads to perform a vibration compensation that blocks the intention of the steering operator, therefore a problem that the steering wheel's inertia feeling increases occurs.

Further, road surface information (such as an asphalt road surface or a gravel road surface) is included in a vehicle reaction force component from tires. Although the amplitude of the road surface information is relatively small, it becomes necessary information for the steering operator. Although it is often desired that the electric power steering apparatus does not suppress such information and transmits such information to the steering operator, since the amplitude of the road surface information is also small, according to the vibration extraction method of Patent Document 4, there is a possibility that the amplitude of the road surface information becomes being within the hysteresis width and the road surface information is compensated.

To solve the above-described problem, inventors of the present invention have focused on a motor angular velocity, and have proposed an electric power steering apparatus that is capable of efficiently suppressing vibrations by extracting a vibration component having an arbitrary amplitude and an arbitrary frequency range depending on an electric power steering state parameter related to the motor angular velocity and feeding back a vibration suppression compensation value calculated depending on the extracted vibration component to a control system in Japanese Unexamined Patent Publication No. 2013-233907 A (Patent Document 5).

Even though the apparatus disclosed in Patent Document 5 can suppress vibrations, a low frequency energy component that a driver feels as a response of a steering wheel remains in the motor angular velocity, and its influence may increase a viscous feeling slightly. Whereas, an effect of suppressing this increase of the viscous feeling can be expected by using a motor angular acceleration obtained by differentiating the motor angular velocity, and more effect of suppressing vibrations can be expected because torque ripples (torque vibrations) being a main factor of floor vibrations remarkably appear in the motor angular acceleration.

The present invention has been developed in view of the above-described circumstances, and an object of the present invention is to provide an electric power steering apparatus that is capable of efficiently suppressing the torque ripple and simultaneously minimizing the steering performance degradation such as an increase in the steering wheel's inertia feeling by extracting the torque ripple vibration component depending on the electric power steering state parameter determined based on the motor angular velocity and the motor angular acceleration and feeding back the vibration suppression compensation value calculated depending on the extracted vibration component or depending on the extracted vibration component and the electric power steering state parameter sensitive gains for changing the proportion of the vibration suppression compensation to the current command value.

Means for Solving the Problems

The present invention relates to an electric power steering apparatus that provides a steering system of a vehicle with an assist force generated by a motor, the above-described object of the present invention is achieved by that comprising: a current command value determining section that determines a current command value based on a steering torque and a vehicle speed; a vibration extracting filter that extracts a first vibration component having a predetermined amplitude and a first predetermined frequency range depending on a motor angular velocity; a vibration extracting section that extracts a second vibration component having a second predetermined frequency range depending on a motor angular acceleration; a first compensation value calculating section that calculates a first vibration suppression compensation value based on the first vibration component extracted by the vibration extracting filter; and a second compensation value calculating section that calculates a second vibration suppression compensation value based on the second vibration component extracted by the vibration extracting section; wherein vibrations of the motor are suppressed by feeding back the first vibration suppression compensation value calculated by the first compensation value calculating section and the second vibration suppression compensation value calculated by the second compensation value calculating section to the current command value determined by the current command value determining section; wherein the vibration extracting filter comprises an extraction inverse characteristic filter with window that calculates a vibration center value based on the motor angular velocity and depending on an inverse characteristic of the first predetermined frequency range, and extracts the first vibration component having the predetermined amplitude and the first predetermined frequency range based on a difference between the vibration center value and the motor angular velocity; wherein the extraction inverse characteristic filter with window comprises an inverse characteristic filter that has the inverse characteristic of the first predetermined frequency range and an amplitude window judging section where the predetermined amplitude is preset; wherein the extraction inverse characteristic filter with window inputs the motor angular velocity to the inverse characteristic filter, and then outputs an output of the inverse characteristic filter to the amplitude window judging section; wherein the amplitude window judging section performs an amplitude window judging process that judges whether the motor angular velocity is within an amplitude window being a previous value of the vibration center value± the predetermined amplitude or not based on the motor angular velocity, the output of the inverse characteristic filter and the previous value of the vibration center value, in a case of judging that the motor angular velocity is within the amplitude window, outputs the output of the inverse characteristic filter as the vibration center value, and in a case of judging that the motor angular velocity is outside the amplitude window, outputs a value obtained by adding the predetermined amplitude to the motor angular velocity or subtracting the predetermined amplitude from the motor angular velocity as the vibration center value.

Further, the above-described object of the present invention is more effectively achieved by an electric power steering apparatus that provides a steering system of a vehicle with an assist force generated by a motor, comprising: a current command value determining section that determines a current command value based on a steering torque and a vehicle speed; a vibration extracting filter that extracts a first vibration component having a predetermined amplitude and a first predetermined frequency range depending on a motor angular velocity; a vibration extracting section that extracts a second vibration component having a second predetermined frequency range depending on a motor angular acceleration; a first compensation value calculating section that calculates a first vibration suppression compensation value based on the first vibration component extracted by the vibration extracting filter; and a second compensation value calculating section that calculates a second vibration suppression compensation value based on the second vibration component extracted by the vibration extracting section; wherein vibrations of the motor are suppressed by feeding back the first vibration suppression compensation value calculated by the first compensation value calculating section and the second vibration suppression compensation value calculated by the second compensation value calculating section to the current command value determined by the current command value determining section; wherein the vibration extracting filter comprises an extraction inverse characteristic filter with window that calculates a vibration center value based on the motor angular velocity and depending on an inverse characteristic of the first predetermined frequency range, and extracts the first vibration component having the predetermined amplitude and the first predetermined frequency range based on a difference between the vibration center value and the motor angular velocity; wherein the extraction inverse characteristic filter with window comprises an inverse characteristic filter that has the inverse characteristic of the first predetermined frequency range and an amplitude window judging section that comprises a means of increasing or decreasing the predetermined amplitude that is preset depending on an command current parameter relating to motor current amount; wherein the extraction inverse characteristic filter with window inputs the motor angular velocity to the inverse characteristic filter, and then outputs an output of the inverse characteristic filter to the amplitude window judging section; wherein the amplitude window judging section performs an amplitude window judging process that judges whether the motor angular velocity is within an amplitude window being a previous value of the vibration center value± the predetermined amplitude or not based on the motor angular velocity, the output of the inverse characteristic filter and the previous value of the vibration center value after setting the predetermined amplitude by increasing or decreasing the predetermined amplitude depending on the command current parameter relating to motor current amount, in a case of judging that the motor angular velocity is within the amplitude window, outputs the output of the inverse characteristic filter as the vibration center value, and in a case of judging that the motor angular velocity is outside the amplitude window, outputs a value obtained by adding the predetermined amplitude to the motor angular velocity or subtracting the predetermined amplitude from the motor angular velocity as the vibration center value; wherein the vibration extracting section comprises a means of changing the second predetermined frequency range depending on the command current parameter relating to motor current amount; and wherein the vibration extracting section outputs the second vibration component having the second predetermined frequency range after setting the second predetermined frequency range by changing the second predetermined frequency range depending on the command current parameter relating to motor current amount; or wherein the command current parameter relating to motor current amount is the current command value or the steering torque; or wherein the command current parameter relating to motor current amount is the current command value; and wherein the amplitude window judging section sets the predetermined amplitude so as to increase the predetermined amplitude depending on an increase in the current command value; or wherein the first compensation value calculating section calculates first sensitive gains for changing a proportion of a vibration suppression compensation depending on an electric power steering state parameter relating to motor current amount and an electric power steering state parameter relating to velocity, and sets a value obtained by multiplying a vibration suppression compensation value calculated based on the first vibration component extracted by the vibration extracting filter by calculated the first sensitive gains as the first vibration suppression compensation value; and wherein the second compensation value calculating section calculates second sensitive gains for changing a proportion of a vibration suppression compensation depending on the electric power steering state parameter relating to motor current amount and the electric power steering state parameter relating to velocity, and sets a value obtained by multiplying a vibration suppression compensation value calculated based on the second vibration component extracted by the vibration extracting section by calculated the second sensitive gains as the second vibration suppression compensation value; or wherein the first compensation value calculating section decreases a proportion of the first vibration suppression compensation value by decreasing the first sensitive gain concerning the electric power steering state parameter relating to motor current amount in a case that the electric power steering state parameter relating to motor current amount is less than or equal to a predetermined threshold, and decreases the proportion of the first vibration suppression compensation value by decreasing the first sensitive gain concerning the electric power steering state parameter relating to velocity in a case that the electric power steering state parameter relating to velocity is more than or equal to a predetermined threshold; and wherein the second compensation value calculating section decreases a proportion of the second vibration suppression compensation value by decreasing the second sensitive gain concerning the electric power steering state parameter relating to motor current amount in a case that the electric power steering state parameter relating to motor current amount is less than or equal to a predetermined threshold, and decreases the proportion of the second vibration suppression compensation value by decreasing the second sensitive gain concerning the electric power steering state parameter relating to velocity in a case that the electric power steering state parameter relating to velocity is more than or equal to a predetermined threshold; or wherein the electric power steering state parameter relating to motor current amount is the current command value or the steering torque; and wherein the electric power steering state parameter relating to velocity is a steering velocity, the motor angular velocity, or the motor angular acceleration.

Further, the above-described object of the present invention is more effectively achieved by an electric power steering apparatus that provides a steering system of a vehicle with an assist force generated by a motor, comprising: a current command value determining section that determines a current command value based on a steering torque and a vehicle speed; a vibration extracting filter that extracts a first vibration component having a predetermined amplitude and a first predetermined frequency range depending on a motor angular velocity; a vibration extracting section that extracts a second vibration component having a second predetermined frequency range depending on a motor angular acceleration; a first compensation value calculating section that calculates a first vibration suppression compensation value based on the first vibration component extracted by the vibration extracting filter; and a second compensation value calculating section that calculates a second vibration suppression compensation value based on the second vibration component extracted by the vibration extracting section; wherein vibrations of the motor are suppressed by feeding back the first vibration suppression compensation value calculated by the first compensation value calculating section and the second vibration suppression compensation value calculated by the second compensation value calculating section to the current command value determined by the current command value determining section; wherein the vibration extracting filter comprises an extraction inverse characteristic filter with window that calculates a vibration center value based on the motor angular velocity and depending on an inverse characteristic of the first predetermined frequency range, and extracts the first vibration component having the predetermined amplitude and the first predetermined frequency range based on a difference between the vibration center value and the motor angular velocity; wherein the extraction inverse characteristic filter with window comprises an inverse characteristic filter that has the inverse characteristic of the first predetermined frequency range and an amplitude window judging section that comprises a means of increasing or decreasing the predetermined amplitude that is preset depending on the vehicle speed; wherein the extraction inverse characteristic filter with window inputs the motor angular velocity to the inverse characteristic filter, and then outputs an output of the inverse characteristic filter to the amplitude window judging section; wherein the amplitude window judging section performs an amplitude window judging process that judges whether the motor angular velocity is within an amplitude window being a previous value of the vibration center value± the predetermined amplitude or not based on the motor angular velocity, the output of the inverse characteristic filter and the previous value of the vibration center value after setting the predetermined amplitude by increasing or decreasing the predetermined amplitude depending on the vehicle speed, in a case of judging that the motor angular velocity is within the amplitude window, outputs the output of the inverse characteristic filter as the vibration center value, and in a case of judging that the motor angular velocity is outside the amplitude window, outputs a value obtained by adding the predetermined amplitude to the motor angular velocity or subtracting the predetermined amplitude from the motor angular velocity as the vibration center value; wherein the vibration extracting section comprises a means of changing the second predetermined frequency range depending on the vehicle speed; and wherein the vibration extracting section outputs the second vibration component having the second predetermined frequency range after setting the second predetermined frequency range by changing the second predetermined frequency range depending on the vehicle speed; or wherein the first compensation value calculating section calculates a first vehicle speed sensitive gain for changing a proportion of a vibration suppression compensation depending on the vehicle speed, and sets a value obtained by multiplying a vibration suppression compensation value calculated based on the first vibration component extracted by the vibration extracting filter by calculated the first vehicle speed sensitive gain as the first vibration suppression compensation value; and wherein the second compensation value calculating section calculates a second sensitive gain for changing a proportion of a vibration suppression compensation depending on the vehicle speed, and sets a value obtained by multiplying a vibration suppression compensation value calculated based on the second vibration component extracted by the vibration extracting section by calculated the second vehicle speed sensitive gain as the second vibration suppression compensation value; or wherein in a case that the vehicle speed is more than or equal to a predetermined vehicle speed, the amplitude window judging section sets the predetermined amplitude by decreasing the predetermined amplitude depending on the vehicle speed, the first compensation value calculating section decreases a proportion of the first vibration suppression compensation value by decreasing the first vehicle speed sensitive gain, and the second compensation value calculating section decreases a proportion of the second vibration suppression compensation value by decreasing the second vehicle speed sensitive gain.

Further, the above-described object of the present invention is more effectively achieved by an electric power steering apparatus that provides a steering system of a vehicle with an assist force generated by a motor, comprising: a current command value determining section that determines a current command value based on a steering torque and a vehicle speed; a vibration extracting filter that extracts a first vibration component having a predetermined amplitude and a first predetermined frequency range depending on a motor angular velocity; a first compensation value calculating section that calculates a first vibration suppression compensation value based on the first vibration component extracted by the vibration extracting filter; and a second compensation value calculating section that calculates a second vibration suppression compensation value based on a motor angular acceleration; wherein vibrations of the motor are suppressed by feeding back the first vibration suppression compensation value calculated by the first compensation value calculating section and the second vibration suppression compensation value calculated by the second compensation value calculating section to the current command value determined by the current command value determining section; wherein the vibration extracting filter comprises an extraction inverse characteristic filter with window that calculates a vibration center value based on the motor angular velocity and depending on an inverse characteristic of the first predetermined frequency range, and extracts the first vibration component having the predetermined amplitude and the first predetermined frequency range based on a difference between the vibration center value and the motor angular velocity; wherein the extraction inverse characteristic filter with window comprises an inverse characteristic filter that has the inverse characteristic of the first predetermined frequency range and an amplitude window judging section where the predetermined amplitude is preset; wherein the extraction inverse characteristic filter with window inputs the motor angular velocity to the inverse characteristic filter, and then outputs an output of the inverse characteristic filter to the amplitude window judging section; wherein the amplitude window judging section performs an amplitude window judging process that judges whether the motor angular velocity is within an amplitude window being a previous value of the vibration center value± the predetermined amplitude or not based on the motor angular velocity, the output of the inverse characteristic filter and the previous value of the vibration center value, in a case of judging that the motor angular velocity is within the amplitude window, outputs the output of the inverse characteristic filter as the vibration center value, and in a case of judging that the motor angular velocity is outside the amplitude window, outputs a value obtained by adding the predetermined amplitude to the motor angular velocity or subtracting the predetermined amplitude from the motor angular velocity as the vibration center value.

Furthermore, the above-described object of the present invention is more effectively achieved by that wherein the first predetermined frequency range is a frequency range except vibration components of a frequency range that the electric power steering apparatus aims to transmit to a steering operator; or wherein the first predetermined frequency range is a frequency range except a frequency range that the electric power steering apparatus aims to transmit to a steering operator and a frequency range being more than or equal to a frequency limited by sampling and so on where vibration extraction accuracy becomes worse; or wherein the second predetermined frequency range is a frequency range except vibration components of a frequency range that the electric power steering apparatus aims to transmit to a steering operator; or wherein the second predetermined frequency range is a frequency range except a frequency range that the electric power steering apparatus aims to transmit to a steering operator and a frequency range being more than or equal to a frequency limited by sampling and so on where vibration extraction accuracy becomes worse; or wherein the frequency range that the electric power steering apparatus aims to transmit to the steering operator is a frequency range being less than or equal to about 10 [Hz] that road surface information, tire conditions and so on are included in; or wherein the frequency range being more than or equal to the frequency limited by sampling and so on where the vibration extraction accuracy becomes worse is a frequency range being more than or equal to about 50 [Hz].

Effects of the Invention

The electric power steering apparatus of the present invention extracts the torque ripple vibration component depending on the electric power steering state parameter based on the motor angular velocity and the motor angular acceleration by means of the vibration extracting filter. Moreover, the present invention utilizes that torque ripples being a main factor of floor vibrations remarkably appear in the motor angular acceleration, and has the function of suppressing the torque ripple caused by various factors by extracting the vibration component of the motor angular acceleration by means of the vibration extracting section, calculating the compensation value for suppressing vibrations by means of the compensation value calculating section, and feeding back (subtraction-compensating by feeding back) this compensation value to the current command value. Further, the vibration extracting section has the filter function by the filter (for example, weighted average, low-pass, high-pass, band-pass and so on) that outputs a vibration component of a characteristic of a predetermined frequency range, and is configured by using the output. This enables the extraction of the torque ripple vibration component having the predetermined frequency range depending on the motor angular acceleration, so that it is possible to efficiently extract a vibration component, such as the torque ripple, whose amplitude is smaller than a steering component, and vibration extraction becomes possible while performing separation of vibration components such as the road surface information and so on that should be fed back to the steering operator and vibration components such as the torque ripple, the judder vibration and so on that should be suppressed. Therefore, it is possible to efficiently suppress the torque ripple vibration while minimizing the steering performance degradation (for example, the increase in the inertia feeling). It is also possible to suppress the increase in the viscous feeling caused by the low frequency energy component by using the motor angular acceleration.

Further, in the present invention, in calculating the vibration suppression compensation value based on the extracted vibration component, since varying the proportion of the vibration suppression compensation value depending on the electric power steering state parameter relating to motor current amount (for example, the current command value) and the electric power steering state parameter relating to velocity (the motor angular velocity and the motor angular acceleration), i.e. since calculating electric power steering state parameter sensitive gains for changing the proportion of the vibration suppression compensation, it is possible to suppress the viscous feeling at the time of start of the steering operation in the vicinity of on-center that occurs in the state that the signal relating to motor current amount is low, and simultaneously it is also possible to resolve the effect caused by degradation of extraction accuracy of the vibration waveform that occurs in the case that the signal relating to velocity indicates a high rotational velocity.

MODE FOR CARRYING OUT THE INVENTION

Figure 1:
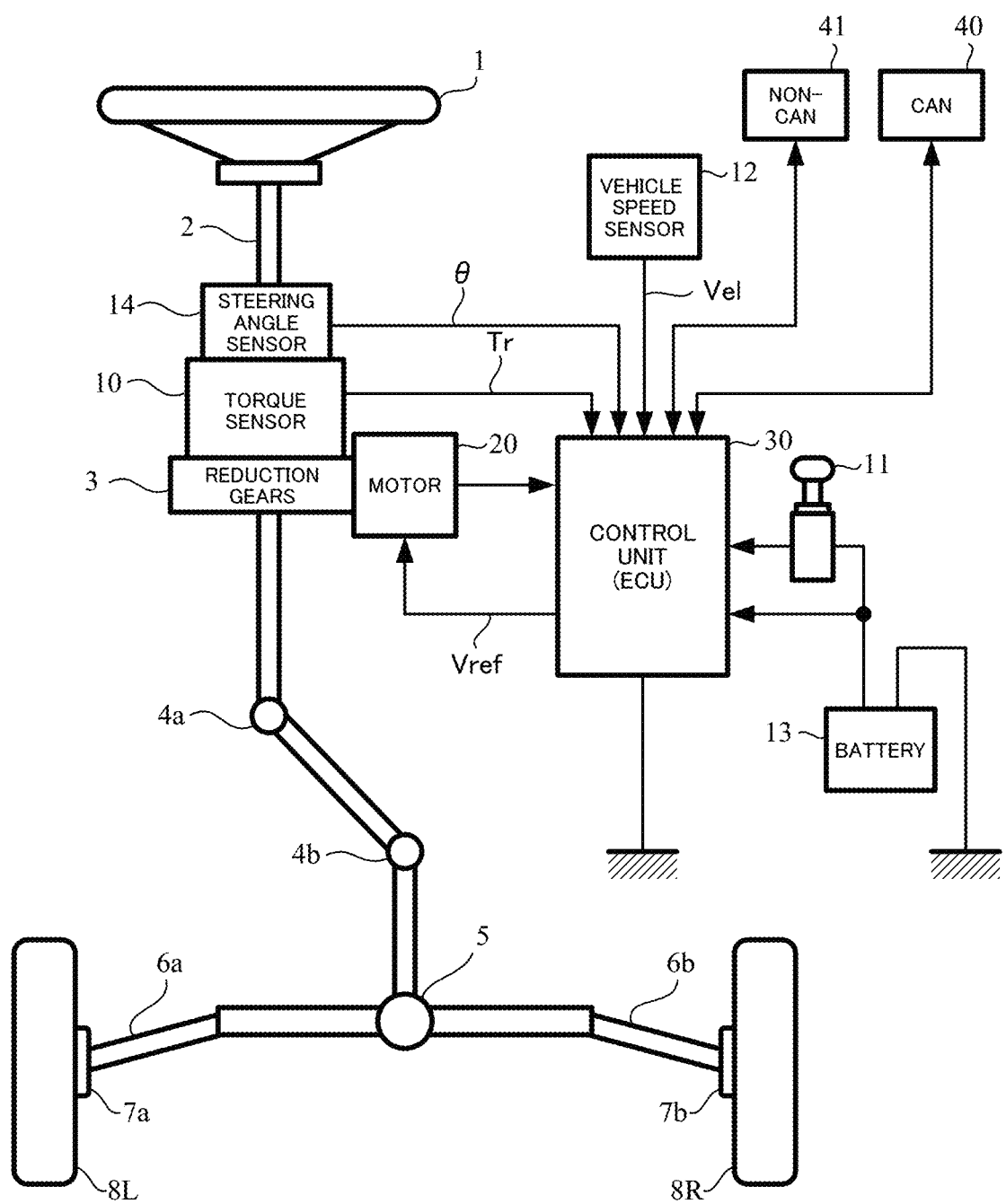
FIG. 1 is a configuration diagram illustrating a general outline of an electric power steering apparatus.

The present invention is an electric power steering apparatus that is capable of efficiently controlling torque ripples caused by various factors by utilizing a matter that the torque ripples (torque vibrations) being a main factor of floor vibrations appear remarkably in a motor angular velocity signal and a motor angular acceleration signal being electric power steering state parameters, extracting a vibration component that is included in the motor angular velocity signal (a motor angular velocity) and a vibration component that is included in the motor angular acceleration signal (a motor angular acceleration) respectively by means of vibration extracting filters (vibration extracting filter functions), calculating vibration suppression compensation values for suppressing the torque ripples based on extracted each vibration component (a vibration component signal), and feeding back (subtraction-compensating by feeding back) calculated vibration suppression compensation values to a current command value.

Further, in the electric power steering apparatus according to the present invention, in calculating the vibration suppression compensation values, it is also possible to calculate the vibration suppression compensation values based on not only the extracted vibration components but also the current command value and the motor angular velocity signal.

Moreover, in the electric power steering apparatus according to the present invention, in calculating the vibration suppression compensation values, it is also possible to calculate the vibration suppression compensation values based on not only the extracted vibration components but also the current command value, the motor angular velocity signal and a vehicle speed.

In the electric power steering apparatus according to the present invention, the vibration extracting filter that extracts the vibration component included in the motor angular velocity signal, is configured so as to work only within a predetermined amplitude, and comprise an extraction inverse characteristic filter with window that has an inverse characteristic filter (for example, weighted average, low-pass, high-pass, band-pass and so on) that outputs a torque ripple vibration component of an inverse characteristic of an arbitrary frequency range with respect to the motor angular velocity signal being inputted into the vibration extracting filter, and extract the torque ripple vibration component having an arbitrary amplitude and the arbitrary frequency range by using a difference between an output of the extraction inverse characteristic filter with window (a vibration center value) and the motor angular velocity signal being inputted into the vibration extracting filter.

That is to say, the above vibration extracting filter comprises the extraction inverse characteristic filter with window that calculates the vibration center value depending on an inverse characteristic of a predetermined frequency range that is obtained by inputting the motor angular velocity signal to the inverse characteristic filter when the motor angular velocity signal is within the predetermined amplitude, and extracts a vibration component having the predetermined amplitude and the predetermined frequency range based on the difference between the vibration center value calculated by the extraction inverse characteristic filter with window and the motor angular velocity signal.

In other words, the vibration extracting filter judges whether the motor angular velocity signal being capable of detecting the vibration component is within the predetermined amplitude or not, updates the vibration center value by means of a filter that outputs the inverse characteristic of the arbitrary frequency range (i.e. the extraction inverse characteristic filter with window) in the case that the motor angular velocity signal is within the predetermined amplitude, updates the vibration center value without using the extraction inverse characteristic filter with window in the case that the motor angular velocity signal is outside the predetermined amplitude, and extracts the vibration component having the arbitrary vibration frequency range and the arbitrary amplitude range by calculating the difference between the updated vibration center value and the initial motor angular velocity signal.

Further, in the electric power steering apparatus according to the present invention, a vibration extracting section that extracts the vibration component included in the motor angular acceleration signal, is a filter (for example, weighted average, low-pass, high-pass, band-pass and so on) that outputs a vibration component of a predetermined frequency range, and is configured so as to extract the torque ripple vibration component having the predetermined frequency range.

According to the electric power steering apparatus of the present invention that has the vibration extracting filter and the vibration extracting section, since it is possible to extract the torque ripple vibration component having the arbitrary amplitude and the arbitrary frequency range depending on the motor angular velocity, in addition, to extract the torque ripple vibration component having the predetermined frequency range depending on the motor angular acceleration, it is possible to efficiently extract the vibration component like the torque ripple whose amplitude is smaller than a steering component, and also since vibration extraction becomes possible while performing separation of vibration components such as a road surface information and so on that should be fed back to a steering operator and vibration components such as the torque ripple, a judder vibration and so on that should be suppressed, when applying the electric power steering apparatus according to the present invention, it is possible to efficiently suppress the torque ripple vibration while minimizing the steering performance degradation (for example, the increase in the steering wheel's inertia feeling that occurs at the time of the micro line-taking steering pattern).

In extracting the torque ripple vibration component having the arbitrary amplitude and the arbitrary frequency range by means of the vibration extracting filter depending on the motor angular velocity being capable of detecting the vibration component, the present invention does not extract a vibration component of a frequency range that the electric power steering apparatus aims to transmit to the steering operator (a vibration component being less than or equal to about 10 [Hz] that the road surface information, tire conditions and so on are included in), and extracts a vibration component of a frequency range that the electric power steering apparatus does not aim to transmit to the steering operator (a vibration component such as the floor vibration caused by system eigenvalue excitation and the motor torque ripple). The arbitrary frequency range is a frequency range of information that the electric power steering apparatus does not aim to transmit to the steering operator. Further, in extracting the torque ripple vibration component having the predetermined frequency range by means of the vibration extracting section depending on the motor angular acceleration, the present invention does not extract the vibration component of the frequency range that the electric power steering apparatus aims to transmit to the steering operator, and a vibration component of a frequency range limited by sampling and so on where vibration extraction accuracy becomes worse (a vibration component being more than or equal to about 50 [Hz]).

In this way, since the present invention can extract the torque ripple vibration component by a simple configuration, it becomes possible to efficiently suppress the vibration component caused by the torque ripple, mechanical resonance and so on without causing a steering uncomfortable feeling as the electric power steering apparatus while efficiently using microcomputer resource.

Hereinafter, concrete embodiments of the present invention will be described in detail with reference to the accompanying drawings.

1. First Embodiment

Figure 2:
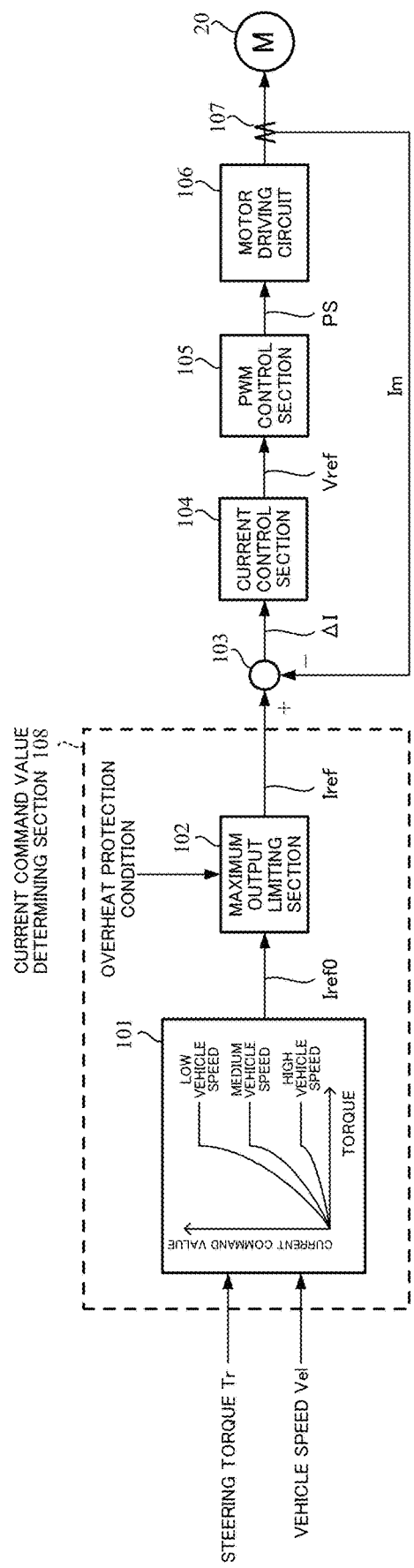
FIG. 2 is a block diagram showing a general configuration example of a control unit.
Figure 3:
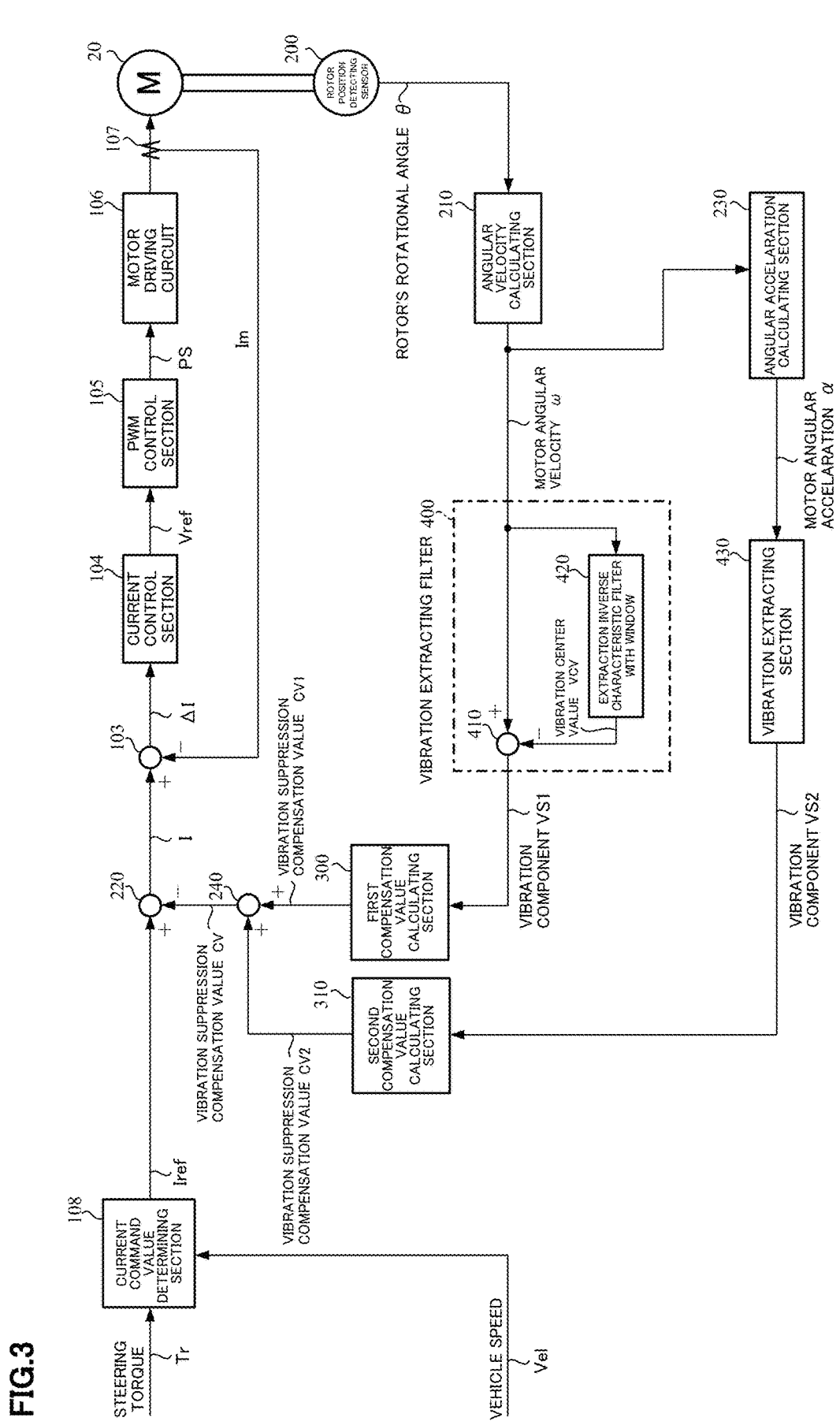
FIG. 3 is a block diagram showing a configuration example of a first embodiment of an electric power steering apparatus according to the present invention.
Figure 4:
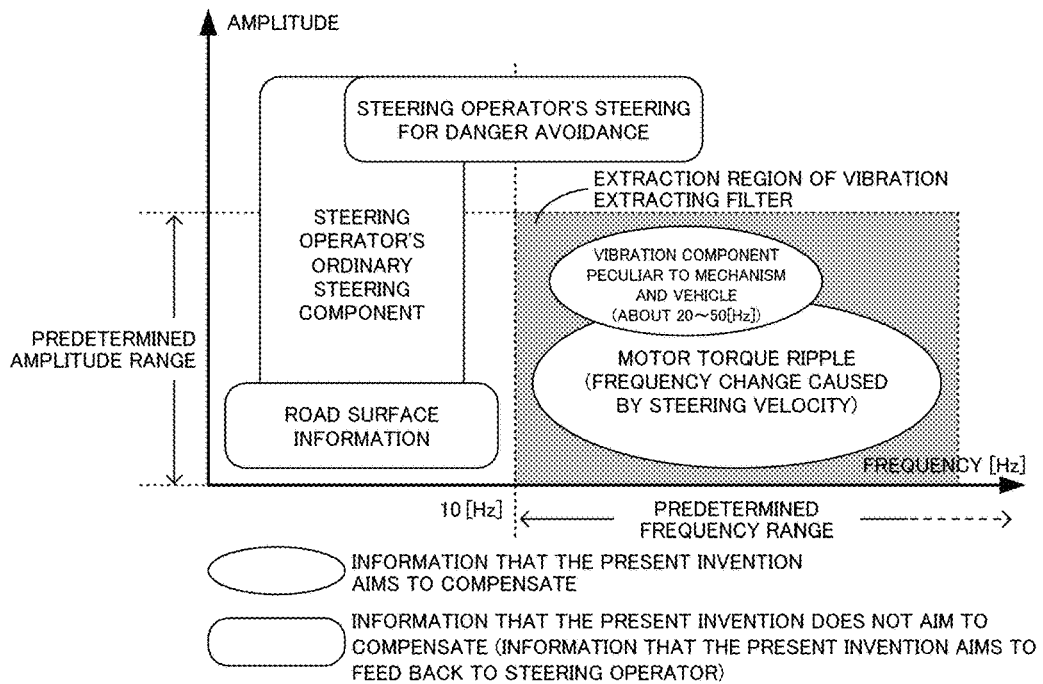
FIG. 4 is a diagram showing frequency distribution examples of vibration components.
Figure 5A:
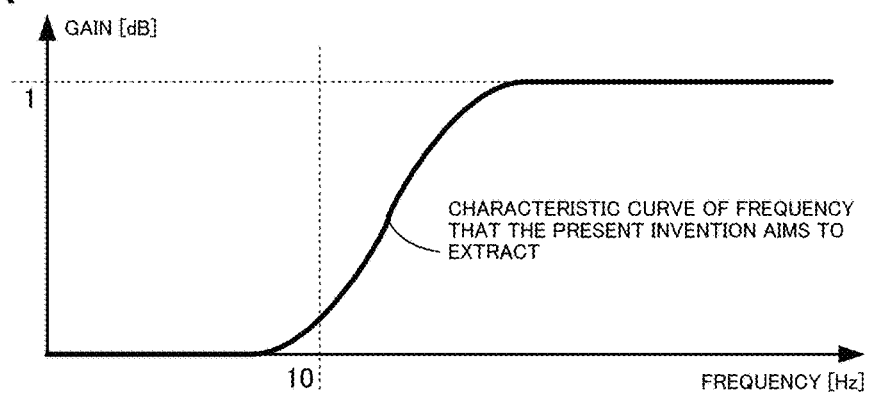
FIGS. 5A and 5B are diagrams showing characteristic setting examples of an extraction inverse characteristic filter with window (examples in a case that a predetermined frequency range that the present invention aims to extract is a high-pass characteristic) in the first embodiment of the electric power steering apparatus according to the present invention.
Figure 5B:
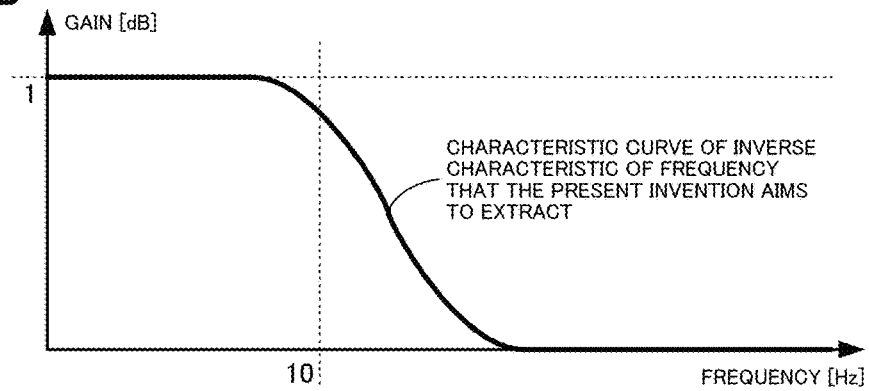

FIG. 3 is a block diagram showing a configuration example of a first embodiment of the electric power steering apparatus according to the present invention, the portion of the electric power steering apparatus is shown as corresponding to FIGS. 1 and 2, and with respect to identical configurations, identical reference numerals are given without adding explanations. Further, FIG. 4 shows frequency distribution examples of vibration components. Then, FIGS. 5A and 5B are diagrams showing characteristic setting examples of the extraction inverse characteristic filter with window (examples in a case that the predetermined frequency range that the present invention aims to extract is a high-pass characteristic) in the first embodiment.

With reference to FIGS. 3, 4, 5A and 5B, functions and the whole operation of the electric power steering apparatus according to the first embodiment of the present invention will be described in detail.

As shown in FIG. 3, a current command value determining section 108 determines a current command value Iref based on a steering torque Tr detected by a torque sensor 10 and a vehicle speed Vel detected by a vehicle speed sensor 12. The determined current command value Iref is inputted into a subtracting section 220.

Meanwhile, a motor current Im being applied to a motor 20 is detected by a motor current detecting circuit 107, and the detected motor current Im is inputted into a subtracting section 103.

Further, a rotor's rotational angle θ being a rotor position signal is detected by a rotor position detecting sensor 200 for detecting a rotor position of the motor 20 (a rotor position detector such as a resolver or a Hall sensor). An angular velocity calculating section 210 calculates a motor angular velocity ω based on the rotor's rotational angle θ detected by the rotor position detecting sensor 200. An angular acceleration calculating section 230 calculates a motor angular acceleration a based on the motor angular velocity ω. Then, the motor angular velocity ω calculated by the angular velocity calculating section 210 is inputted into a vibration extracting filter 400, and the motor angular acceleration a calculated by the angular acceleration calculating section 230 is inputted into a vibration extracting section 430.

The vibration extracting filter 400 extracts a vibration component having a predetermined amplitude and a predetermined frequency range based on the inputted motor angular velocity ω, and the extracted vibration component VS1 is inputted into a first compensation value calculating section 300. The vibration extracting section 430 extracts a vibration component having a predetermined frequency range based on the inputted motor angular acceleration a, and the extracted vibration component VS2 is inputted into a second compensation value calculating section 310.

The first compensation value calculating section 300 calculates a vibration suppression compensation value CV1 based on the vibration component VS1, and the calculated vibration suppression compensation value CV1 is inputted into an adding section 240. The second compensation value calculating section 310 calculates a vibration suppression compensation value CV2 based on the vibration component VS2, and the calculated vibration suppression compensation value CV2 is also inputted into the adding section 240.

Then, a vibration-compensated current command value I is calculated by subtracting a vibration suppression compensation value CV (=CV1+CV2) obtained by addition of the adding section 240 from the current command value Iref in the subtracting section 220, that is, by being configured so as to feedback the vibration suppression compensation value CV to the current command value Iref. The calculated current command value I is inputted into the subtracting section 103.

Then, the subtracting section 103 obtains a deviation ΔI (=I−Im) between the vibration-compensated current command value I and the motor current Im of the motor 20 being fed back, the obtained deviation ΔI is controlled by a current control section 104, a controlled voltage control command value Vref is inputted into a PWM control section 105 so as to calculate a duty ratio, and the motor 20 is driven through a motor driving circuit 106 by a PWM signal PS of which the duty ratio is calculated.

Here, the vibration component having "the predetermined amplitude" and "the predetermined frequency range" being extracted by the vibration extracting filter 400 of the present invention will be described.

The vibration components that the present invention intends to compensate are the torque ripple that mainly occurs in the motor, a resonance vibration produced by a vibration excitation peculiar to a vehicle frame and so on, a vehicle reaction force component from tires, and so on. Amplitudes of these vibration components are smaller than the amplitude of the steering component of the steering operator. That is to say, the amplitudes of the vibration components such as the torque ripple and the road surface disturbance are smaller than the amplitude of the steering component of the steering operator.

As described above, the vibration extraction method of Patent Document 4 also performs the extraction of these vibration components by extracting a vibration waveform within the predetermined amplitude by use of this matter.

However, for example, when running at a high speed, since it is necessary to take the micro line, sometimes the steering operator slightly steers the steering wheel in the vicinity of on-center. Since the amplitude at the time of the micro line-taking steering pattern is very tiny, according to the vibration extraction method of Patent Document 4, since extracting the vibration component only based on the amplitude, the micro line-taking steering pattern is also regarded as the vibration component and compensated, as a result, a problem of increasing the steering inertia feeling and simultaneously becoming a steering fluffy feeling occurs.

Further, the road surface information (such as an asphalt road surface or a gravel road surface) is included in the vehicle reaction force component from tires. Although the amplitude of the road surface information is relatively small, it becomes necessary information for the steering operator. Although it is often desired that the electric power steering apparatus does not suppress such information and transmits such information to the steering operator, since the amplitude of the road surface information is also small, according to the vibration extraction method of Patent Document 4, there is a problem that the amplitude of the road surface information becomes within the hysteresis width and the road surface information is compensated.

FIG. 4 shows a distribution example of the frequency and the amplitude of vibration components. As shown in FIG. 4, the vibration components that the present invention aims to compensate are vibration components peculiar to the mechanism and the vehicle, and the motor torque ripple that are felt by the steering operator as an uncomfortable feeling. On the other hand, the vibration components that the present invention does not aim to compensate (information that the present invention aims to feed back to the steering operator) are the steering operator's steering component, the road surface information and so on, and these vibration components that the present invention does not aim to compensate are distributed in about 10 [Hz] or less.

The present invention efficiently suppresses the vibration components becoming the uncomfortable feeling to improve the steering performance without effects on the steering feeling caused by the electric power steering apparatus by limiting the suppressed vibration component to the vibration component having "the predetermined amplitude" and "the predetermined frequency range" by means of the vibration extracting filter. "The predetermined frequency range" here means a frequency range of the vibration component that the present invention aims to compensate. The vibration extracting filter targeting the motor angular velocity is especially effective for the extraction of the vibration component in a low range of "the predetermined frequency range" (in the vicinity of 20 Hz).

Here, functions and operations of the vibration extracting filter 400 will be described.

As shown in FIG. 3, the vibration extracting filter 400 comprises a subtracting section 410 and an extraction inverse characteristic filter with window 420. Processes (operations) performed by the vibration extracting filter 400 are as follows.

At first, the vibration extracting filter 400 extracts a vibration component having an inverse characteristic of "the predetermined amplitude" and "the predetermined frequency range" based on the motor angular velocity ω from the angular velocity calculating section 210 by means of the extraction inverse characteristic filter with window 420. The vibration component having the inverse characteristic of "the predetermined amplitude" and "the predetermined frequency range" is outputted from the extraction inverse characteristic filter with window 420 as a vibration center value VCV.

Next, the vibration extracting filter 400 extracts the vibration component VS1 having "the predetermined amplitude" and "the predetermined frequency range" by calculating a difference between the vibration component having the inverse characteristic of "the predetermined amplitude" and "the predetermined frequency range" (the vibration center value VCV) and the motor angular velocity ω by means of the subtracting section 410. The vibration component VS1 having "the predetermined amplitude" and "the predetermined frequency range" extracted by the vibration extracting filter 400 is inputted into the first compensation value calculating section 300.

"The inverse characteristic" called by the present invention is such a characteristic that allows passage of frequencies of information that the present invention does not aim to compensate shown in such as FIG. 4 and cuts frequencies that the present invention aims to compensate. In the example of FIG. 4, since not extracting the vibration component being less than or equal to about 10 [Hz], "the inverse characteristic" of the present invention becomes a low-pass characteristic that its cutoff frequency is about 10 [Hz].

FIGS. 5A and 5B show characteristic setting examples of the extraction inverse characteristic filter with window 420 in the case that "the predetermined frequency range" extracted by the vibration extracting filter 400 is a high-pass characteristic. Concretely, FIG. 5A shows a characteristic curve of a frequency range having the high-pass characteristic that is extracted by the vibration extracting filter 400. Further, FIG. 5B shows a characteristic curve of an inverse characteristic of the frequency range having the high-pass characteristic shown in FIG. 5A (a characteristic curve of an inverse characteristic that the extraction inverse characteristic filter with window 420 has).

Figure 6:
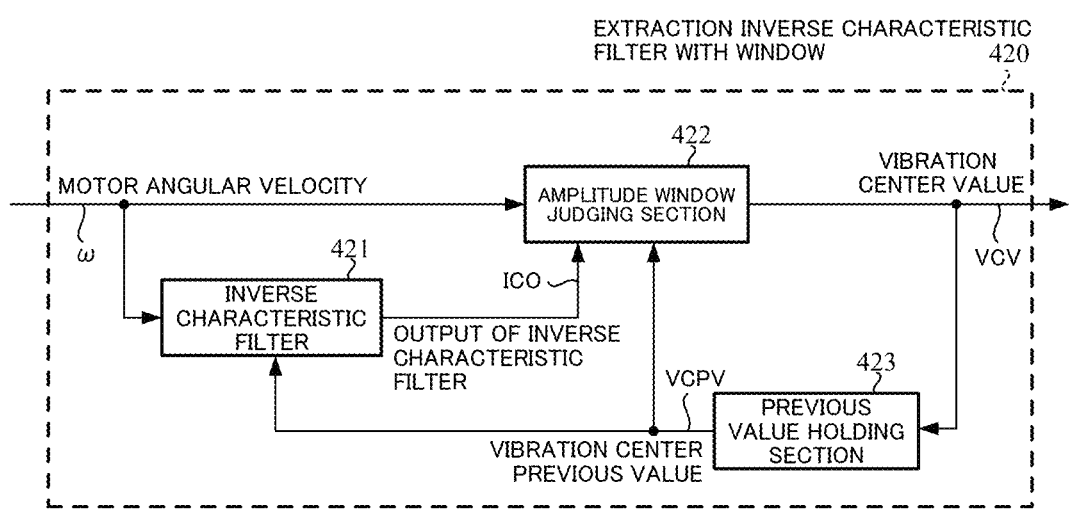
FIG. 6 is a block diagram showing a configuration example of the extraction inverse characteristic filter with window in the first embodiment of the electric power steering apparatus according to the present invention.

FIG. 6 is a block diagram showing a configuration example of the extraction inverse characteristic filter with window 420 in the first embodiment of the electric power steering apparatus according to the present invention. Based on FIG. 6, functions and operations of the extraction inverse characteristic filter with window 420 will be described.

As shown in FIG. 6, the extraction inverse characteristic filter with window 420 comprises an inverse characteristic filter 421 that has the inverse characteristic of "the predetermined frequency range", an amplitude window judging section 422 where "the predetermined amplitude" is preset, and a previous value holding section 423 that holds a vibration center previous value.

With respect to the inputted motor angular velocity ω, processes (operations) performed by the extraction inverse characteristic filter with window 420 are as follows.

At first, the extraction inverse characteristic filter with window 420 inputs the motor angular velocity ω to the inverse characteristic filter 421, and outputs an output ICO of the inverse characteristic filter 421 to the amplitude window judging section 422. Here, the inverse characteristic of "the predetermined frequency" that the inverse characteristic filter 421 has, is the inverse characteristic of frequency characteristic that the present invention aims to extract shown in such as FIG. 5B.

Next, the extraction inverse characteristic filter with window 420 performs an amplitude window judging process that judges whether the motor angular velocity ω is within an amplitude window or not based on the motor angular velocity ω, the output ICO of the inverse characteristic filter 421, and a vibration center previous value VCPV (a previous value of the vibration center value VCV) from the previous value holding section 423 by means of the amplitude window judging section 422.

In the case of judging that the motor angular velocity ω is within the amplitude window by the amplitude window judging process, the amplitude window judging section 422 outputs the output ICO of the inverse characteristic filter 421 as the vibration center value VCV. In the case of judging that the motor angular velocity ω is outside the amplitude window by the amplitude window judging process, the amplitude window judging section 422 outputs a value obtained by adding "the predetermined amplitude" to the motor angular velocity ω or subtracting "the predetermined amplitude" from the motor angular velocity ω as the vibration center value VCV.

"The amplitude window" called by the present invention means a range being the vibration center previous value VCPV±"the predetermined amplitude".

Further, the amplitude window judging section 422 outputs the vibration center value VCV from the amplitude window judging section 422 to both the subtracting section 410 and the previous value holding section 423. The previous value holding section 423 holds the inputted vibration center value VCV as the vibration center previous value VCPV.

In this way, by means of the vibration extracting filter 400, it is possible to extract the vibration component having the predetermined amplitude and the predetermined frequency range, and simultaneously it is possible to perform the vibration compensation without degradation of the steering component.

Figure 7A:
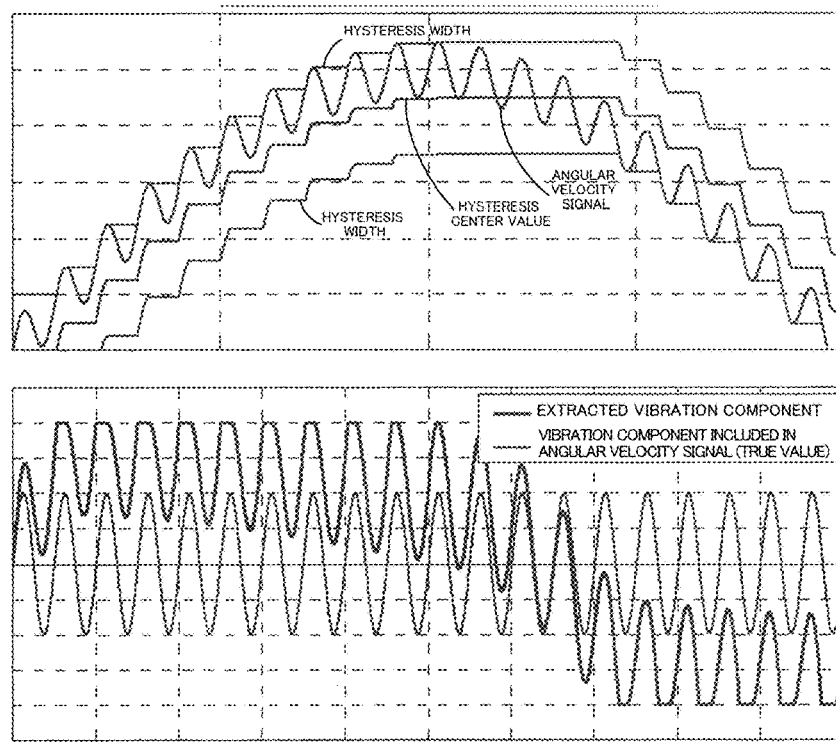
FIG. 7A is a diagram showing a vibration extraction result by a conventional vibration extraction method.
Figure 7B:
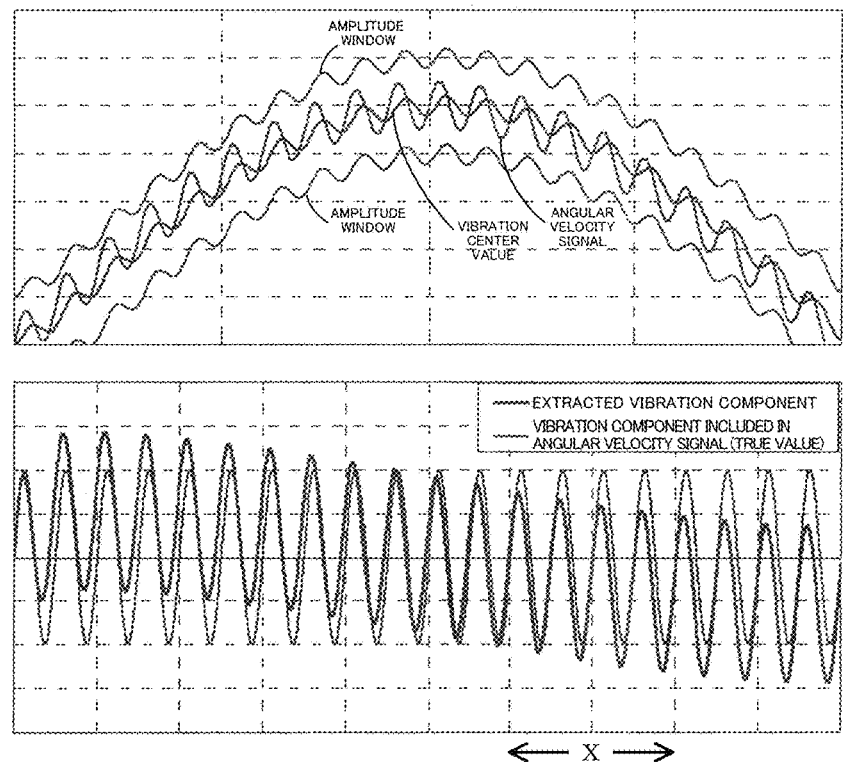
FIG. 7B is a diagram showing a vibration extraction result by a vibration extracting filter in the present invention.

In order to demonstrate excellent vibration extraction effect of the vibration extracting filter 400, FIG. 7A shows a vibration extraction result based on a conventional vibration extraction method, and FIG. 7B shows a vibration extraction result based on the vibration extracting filter 400.

Here, the vibration extraction method of Patent Document 4 is used as the conventional vibration extraction method. Further, "the amplitude window" of FIG. 7B showing the vibration extraction result based on the vibration extracting filter 400 means the vibration center value±"the predetermined amplitude".

In order to compare the vibration extraction result based on the vibration extracting filter 400 with the vibration extraction result based on the vibration extraction method of Patent Document 4, the hysteresis width of the vibration extraction method of Patent Document 4 and the predetermined amplitude of the vibration extracting filter 400 according to the present invention are set so as to become the same value. Further, in extracting the vibration component, also with respect to the necessary motor angular velocity signal, the same signal is used.

As can be seen from FIGS. 7A and 7B, in the vibration extraction result based on the vibration extracting filter 400 according to the present invention, an overlap between the steering component of the low frequency and the extracted vibration component is suppressed. Therefore, the vibration suppression becomes possible while suppressing the effect on the steering feeling caused by the vibration suppression function.

Moreover, in the present invention, it is preferred to utilize the previous value of the vibration center value as a previous value used in the process performed by the extraction inverse characteristic filter with window. Therefore, there is an advantage that with respect to switching of the output of the amplitude window judging section 422, the output of the inverse characteristic filter 421 is connected smoothly, and the uncomfortable feeling does not occur even frequently switching between within the amplitude window and outside the amplitude window.

Further, in the present invention, when using the weighted average in the inverse characteristic filter 421, there is an advantage that with respect to reflection of the vibration center previous value, it is possible to achieve the inverse characteristic filter 421 by means of an easy configuration.

Figure 8A:
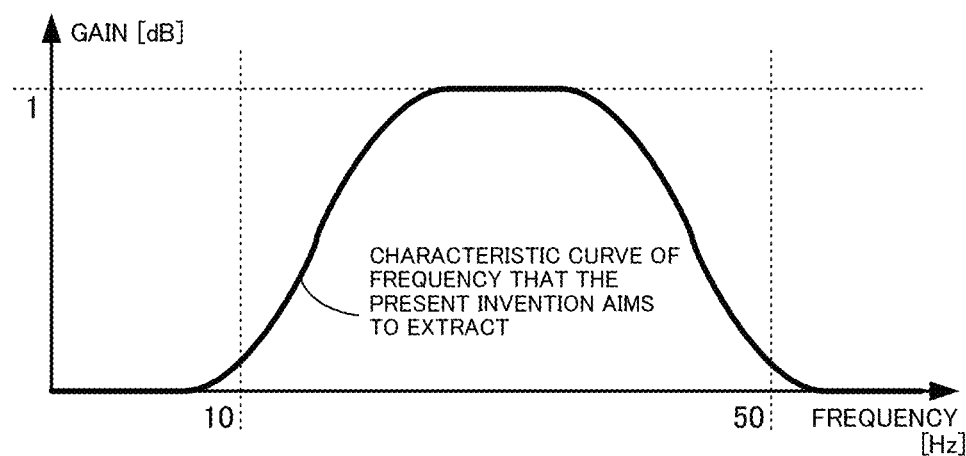
FIGS. 8A and 8B are diagrams showing characteristic setting examples of the extraction inverse characteristic filter with window (examples in a case that the predetermined frequency range that the present invention aims to extract is a band-pass characteristic) in the first embodiment of the electric power steering apparatus according to the present invention.
Figure 8B:
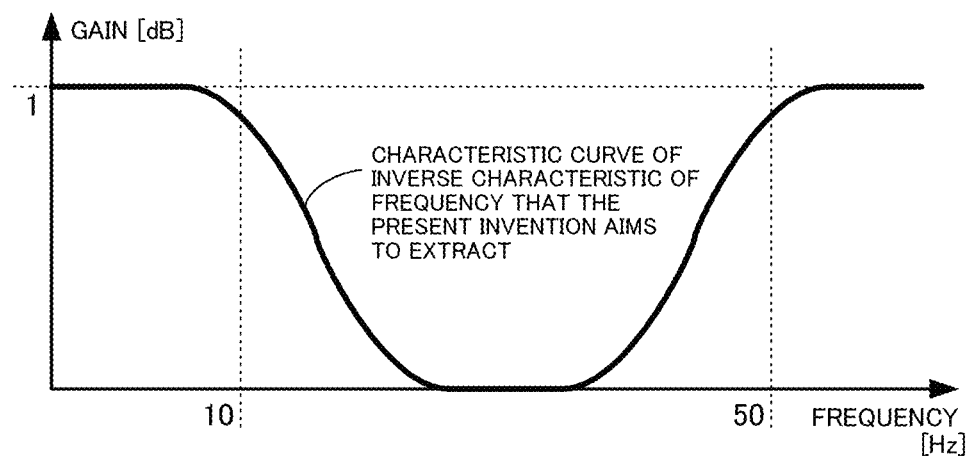

Furthermore, in the first embodiment, although "the predetermined frequency range" extracted by the vibration extracting filter 400 is set to a high-pass characteristic having a cutoff frequency of 10 [Hz], the present invention is not limited to this, and it is also possible to set "the predetermined frequency range" extracted by the vibration extracting filter to a band-pass characteristic. FIGS. 8A and 8B show characteristic setting examples of the extraction inverse characteristic filter with window in the case that "the predetermined frequency range" extracted by the vibration extracting filter of the present invention is a band-pass characteristic.

Concretely, FIG. 8A shows a characteristic curve of a frequency range having the band-pass characteristic that is extracted by the vibration extracting filter. The example of FIG. 8A is the band-pass characteristic that passes a range from about 10 [Hz] to 50 [Hz] since not extracting the vibration component that the present invention does not aim to compensate such as the steering operator's steering component and the road surface information, and not extracting the vibration component of the frequency range limited by sampling and so on where the vibration extraction accuracy becomes worse. Further, FIG. 8B shows a characteristic curve of an inverse characteristic of the frequency range having the band-pass characteristic shown in FIG. 8A (a characteristic curve of an inverse characteristic that the extraction inverse characteristic filter with window has).

Next, functions and operations of the vibration extracting section 430 will be described.

The vibration extracting section 430 extracts the vibration component VS2 having "the predetermined frequency range" based on the motor angular acceleration a from the angular acceleration calculating section 230, and the extracted vibration component VS2 having "the predetermined frequency range" is inputted into the second compensation value calculating section 310 as well as the vibration extracting filter 400. The vibration extracting section 430 targeting the motor angular acceleration a is especially effective for the extraction of the vibration component in a high range of "the predetermined frequency range" (in the vicinity of 40 to 50 Hz).

Figure 9:
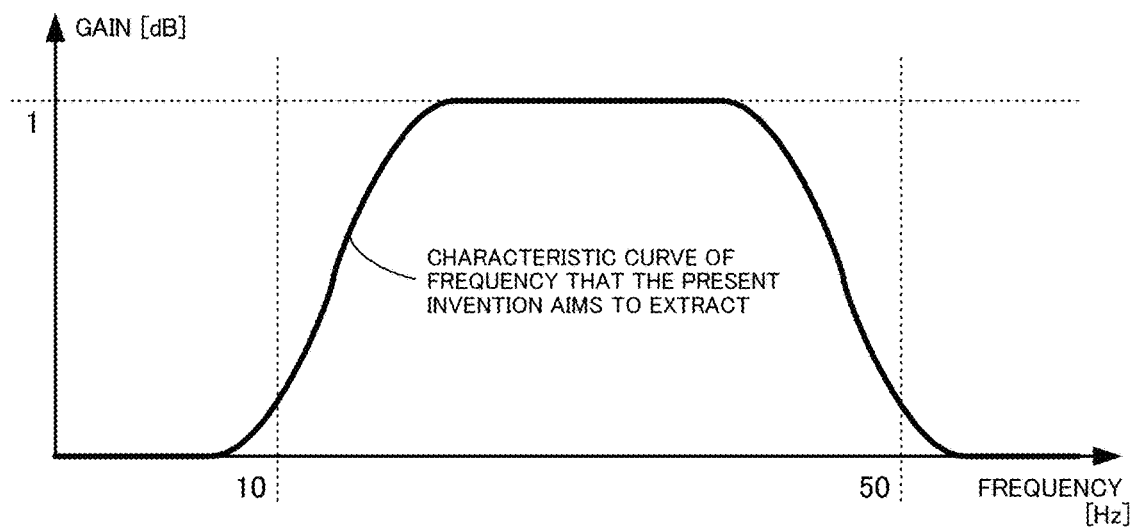
FIG. 9 is a diagram showing a characteristic setting example of a vibration extracting section in the first embodiment of the electric power steering apparatus according to the present invention.

The characteristic of "the predetermined frequency range" extracted by the vibration extracting section 430 is a characteristic that cuts off the frequency of the information that the present invention does not aim to compensate as shown in FIG. 4, and passes the frequency of the information that the present invention aims to compensate. For example, it is a frequency characteristic having a band-pass characteristic as shown in FIG. 9. Though the characteristic shown in FIG. 9 becomes a little steeper characteristic than the characteristic of the vibration extracting filter shown in FIG. 8A, it may be a characteristic similar to that.

Moreover, in the present invention, the characteristic of "the predetermined frequency range" extracted by the vibration extracting section 430 is not limited to the band-pass characteristic as shown in FIG. 9, and the characteristic of "the predetermined frequency range" extracted by the vibration extracting section may be a low-pass characteristic that its cutoff frequency is in the vicinity of 50 [Hz].

Figure 10:
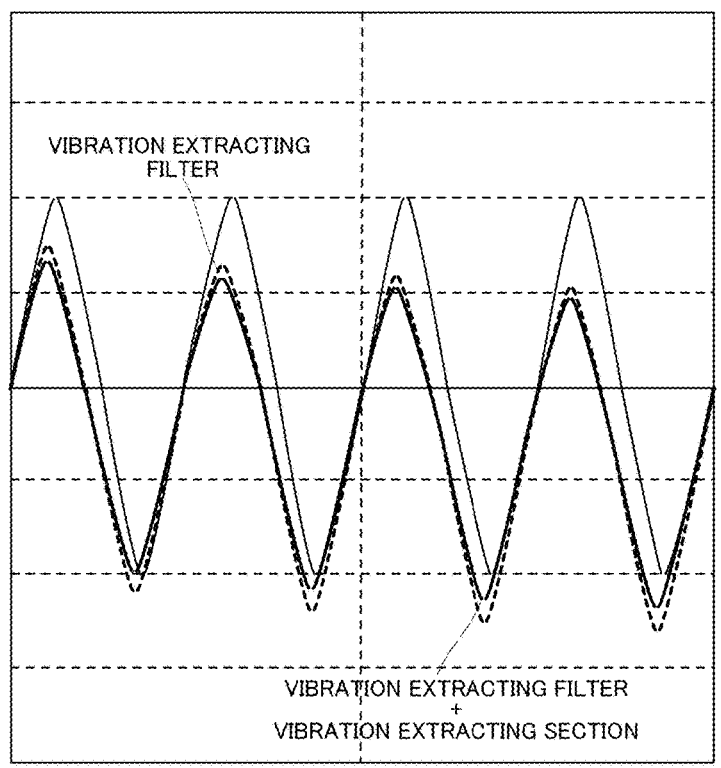
FIG. 10 is a diagram showing a vibration extraction result by the vibration extracting filter and the vibration extracting section in the present invention.

Here, FIG. 10 shows a vibration extraction result based on the vibration extracting section 430. FIG. 10 is a diagram showing a result of applying the vibration extracting section to the vibration extraction result by the vibration extracting filter shown in FIG. 7B, and a section shown by "X" in FIG. 7B is excerpted. A waveform shown by a broken line shows the vibration component (same as FIG. 7B) extracted only by the vibration extracting filter, and a waveform shown by a solid line shows a vibration component extracted by the vibration extracting filter and the vibration extracting section. It can be seen that the overlap between the steering component of the low frequency and the extracted vibration component is more suppressed by applying the vibration extracting section targeting the motor angular acceleration.

Next, the first compensation value calculating section 300 and the second compensation value calculating section 310 will be described.

As shown in FIG. 3, the first compensation value calculating section 300 calculates the vibration suppression compensation value CV1 based on the vibration component VS1 extracted by the vibration extracting filter 400, and the second compensation value calculating section 310 calculates the vibration suppression compensation value CV2 based on the vibration component VS2 extracted by the vibration extracting section 430. The vibration component VS1 extracted by the vibration extracting filter 400 has a dimension of a motor angular velocity, and the vibration component VS2 extracted by the vibration extracting section 430 has a dimension of a motor angular acceleration. However, the vibration suppression compensation value CV1 has a dimension of a current, and the vibration suppression compensation value CV2 also has a dimension of a current, so that it is necessary to convert the dimension of the motor angular velocity into the dimension of the current in the first compensation value calculating section 300, and to convert the dimension of the motor angular acceleration into the dimension of the current in the second compensation value calculating section 310. With respect to the conversion method, even simply configuring by using a gain in each case, sufficient effect can be obtained.

Further, since the motor and the electric power steering apparatus are rotary inertial systems, it is also possible to convert the dimension of the motor angular velocity into the dimension of the current by using a motion equation expressed by the following Expression 1. Further, a denominator of the motion equation of the following Expression 1 is set to an approximate differentiation characteristic to which effects such as noises are added.

$$\frac{Js + D}{Kt(T_1 s + 1)}$$ [Expression 1]

Where "J" is a motor (system) inertia term, "D" is a motor (system) viscous term, "Kt" is a torque constant, and "$T_1$" is an approximate differentiation time constant. Further, it is also possible to configure a phase lead/delay characteristic filter and a PID controller.

In this way, according to the present invention, it is possible to suppress the vibration component that is recognized as the uncomfortable feeling by the steering operator with suppressing effect on the steering feeling. Moreover, since efficiently extracting a vibration component whose amplitude is smaller than one of the steering component while performing separation of vibration components that should be fed back to the steering operator and vibration components that should be suppressed, it is possible to efficiently suppress the torque ripple vibration while minimizing the steering performance degradation (for example, the increase in the inertia feeling).

2. Second Embodiment

In the electric power steering apparatus, a main component of the vibration components that the present invention intends to compensate is the motor torque ripple component, and generally, with respect to the motor torque ripple component, the ripple width tends to become large depending on the current amount to be applied to the motor.

Here, since it is impossible to perform an efficient vibration compensation if the value of "the predetermined amplitude" is not set to a value of the amplitude being capable of extracting the vibration component being the torque ripple, "the predetermined amplitude" is set by using torque ripple amount at the time of a high current as a rough indication. However, conversely, in the vicinity of on-center, i.e. in the vicinity of a low current, the value of "the predetermined amplitude" that is preset by using the torque ripple amount at the time of the high current as the rough indication becomes too large.

It is possible to extract the vibration component having only arbitrary frequency range (the predetermined frequency range) by means of the extraction inverse characteristic filter with window 420 of the first embodiment, however, it is impossible sometimes to completely remove the steering operator's steering component of a low frequency range. In the case that the value of "the predetermined amplitude" being preset is large, the steering component is sometimes overlapped to a certain degree with the vibration extraction result based on the vibration extracting filter 400 and the vibration extracting section 430 of the first embodiment if the steering velocity is large to some extent in on-center steering.

This makes the vibration compensation work in a direction reverse to a direction of steering, as a result, there is a possibility of increasing the inertia feeling in the vicinity of on-center.

In order to solve this problem, a second embodiment sets an optimum value of "the predetermined amplitude" coordinated with vibration components varying depending on a command current parameter relating to motor current amount such as the steering torque or the current command value by varying the value of "the predetermined amplitude" that is preset to the amplitude window judging section depending on the command current parameter. Further, the second embodiment sets an optimum value of "the predetermined frequency range" depending on the command current parameter by also varying the value of "the predetermined frequency range" that is preset to the vibration extracting section depending on the command current parameter.

That is, in the second embodiment, by increasing or decreasing (widening or narrowing) "the predetermined amplitude" that is preset to the amplitude window judging section and changing "the predetermined frequency range" that is preset to the vibration extracting section depending on the command current parameter relating to motor current amount, it becomes possible to improve the extraction accuracy of the torque ripple component and perform a high-accuracy vibration compensation. In this way, in the case of applying the second embodiment, it becomes possible to efficiently suppress the vibration component without generating an increase in the inertia feeling in the vicinity of on-center.

Hereinafter, the electric power steering apparatus in the case of using the current command value as the command current parameter relating to motor current amount, will be described.

Figure 11:
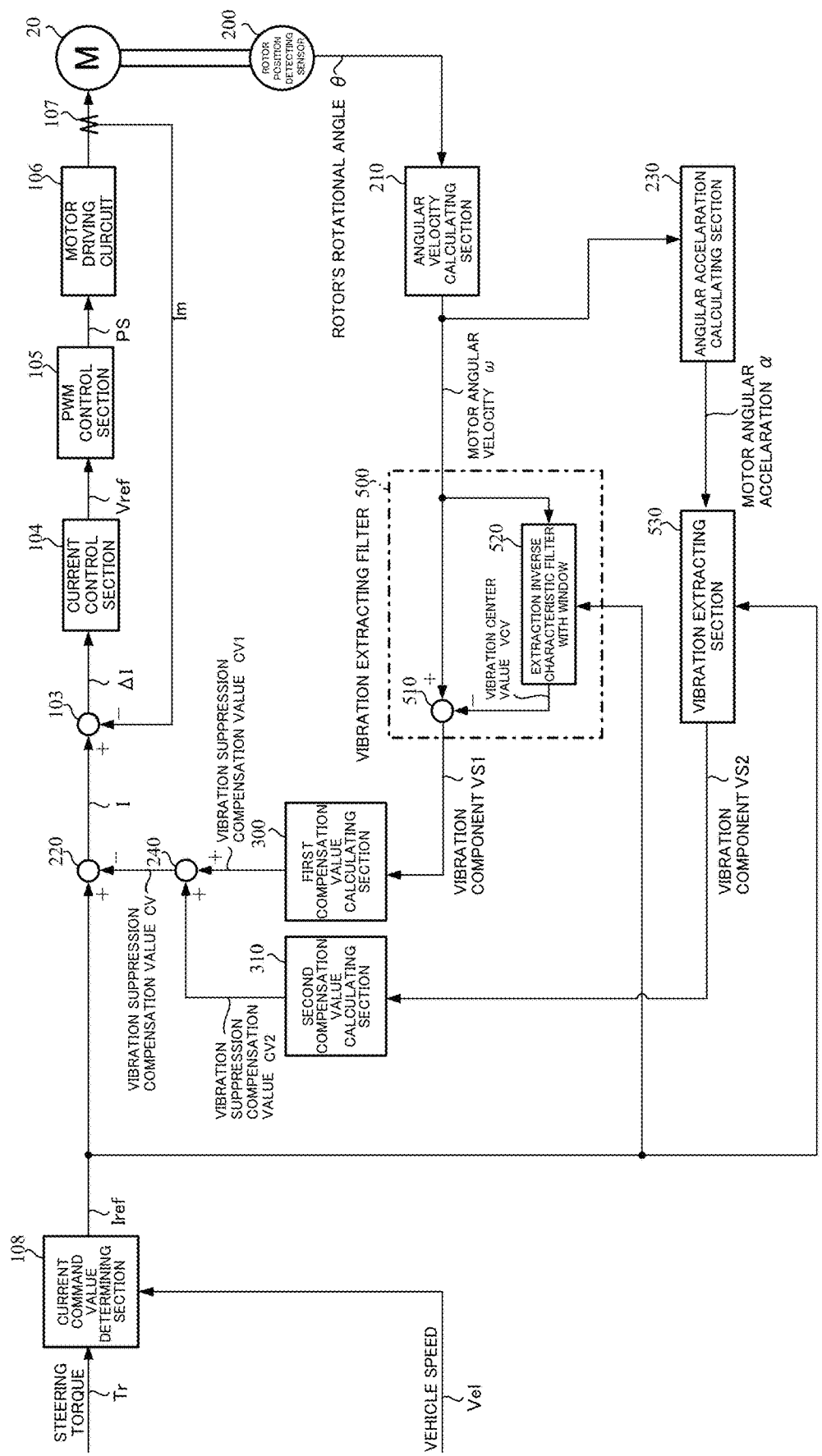
FIG. 11 is a block diagram showing a configuration example of a second embodiment of the electric power steering apparatus according to the present invention.

FIG. 11 is a block diagram showing a configuration example of the second embodiment of the electric power steering apparatus according to the present invention, the portion of the electric power steering apparatus is shown as corresponding to FIGS. 1 and 2, and with respect to identical configurations, identical reference numerals are given without adding explanations.

Since the configuration of the electric power steering apparatus according to the second embodiment shown in FIG. 11 is the same as the configuration of the electric power steering apparatus according to the first embodiment shown in FIG. 3 except the vibration extracting filter 500 and the vibration extracting section 530, explanations about identical configurations are omitted.

Here, functions and operations of the vibration extracting filter 500 will be described.

As shown in FIG. 11, the vibration extracting filter 500 comprises a subtracting section 510 and an extraction inverse characteristic filter with window 520. Processes (operations) performed by the vibration extracting filter 500 are as follows.

At first, the vibration extracting filter 500 extracts a vibration component having an inverse characteristic of "the predetermined amplitude" and "the predetermined frequency range" based on the motor angular velocity ω from the angular velocity calculating section 210 by means of the extraction inverse characteristic filter with window 520. The vibration component having the inverse characteristic of "the predetermined amplitude" and "the predetermined frequency range" is outputted from the extraction inverse characteristic filter with window 520 as the vibration center value VCV.

Next, the vibration extracting filter 500 extracts the vibration component VS1 having "the predetermined amplitude" and "the predetermined frequency range" by calculating a difference between the vibration component having the inverse characteristic of "the predetermined amplitude" and "the predetermined frequency range" (the vibration center value VCV) and the motor angular velocity ω by means of the subtracting section 510. The vibration component VS1 having "the predetermined amplitude" and "the predetermined frequency range" extracted by the vibration extracting filter 500 is inputted into the first compensation value calculating section 300.

Figure 12:
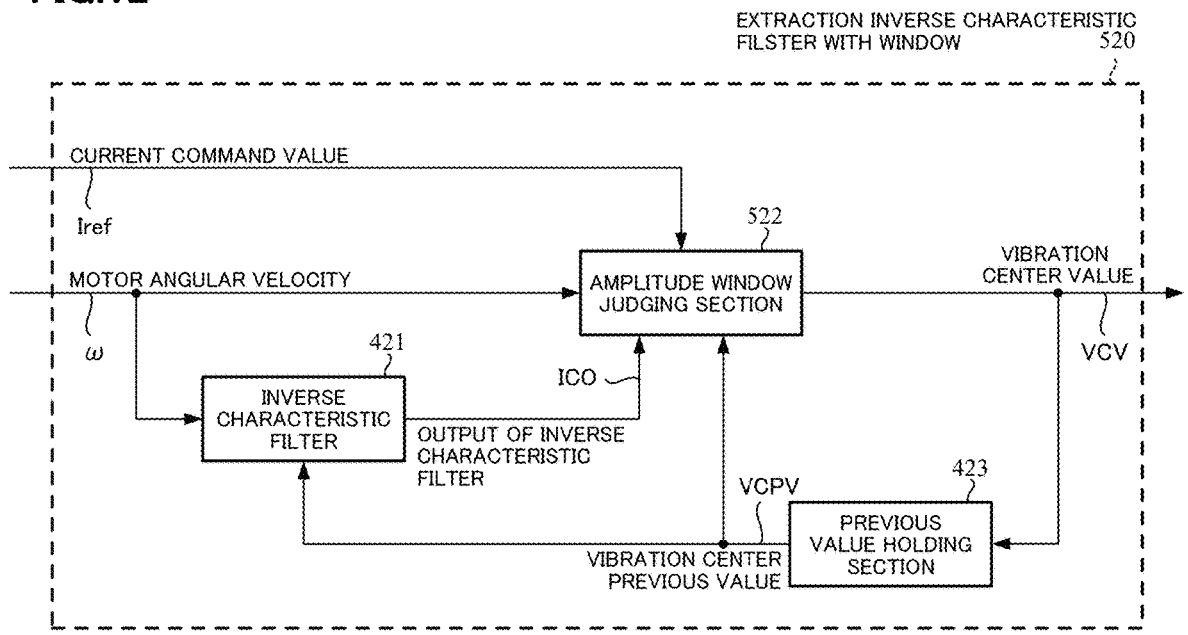
FIG. 12 is a block diagram showing a configuration example of an extraction inverse characteristic filter with window in the second embodiment of the electric power steering apparatus according to the present invention.

FIG. 12 is a block diagram showing a configuration example of the extraction inverse characteristic filter with window 520 in the second embodiment of the electric power steering apparatus according to the present invention. Based on FIG. 12, functions and operations of the extraction inverse characteristic filter with window 520 will be described.

As shown in FIG. 12, the extraction inverse characteristic filter with window 520 comprises the inverse characteristic filter 421 that has the inverse characteristic of "the predetermined frequency range", an amplitude window judging section 522 that comprises a means of increasing or decreasing "the predetermined amplitude" that is preset depending on the current command value, and the previous value holding section 423 that holds the vibration center previous value.

With respect to the inputted motor angular velocity ω, processes (operations) performed by the extraction inverse characteristic filter with window 520 are as follows.

At first, the extraction inverse characteristic filter with window 520 inputs the motor angular velocity ω to the inverse characteristic filter 421, and outputs the output ICO of the inverse characteristic filter 421 to the amplitude window judging section 522. Here, the inverse characteristic of "the predetermined frequency" that the inverse characteristic filter 421 has, is the inverse characteristic of frequency characteristic that the present invention aims to extract shown in such as FIG. 5B.

Next, the extraction inverse characteristic filter with window 520 performs an amplitude window judging process that judges whether the motor angular velocity ω is within the amplitude window or not based on the motor angular velocity ω, the output ICO of the inverse characteristic filter 421, and the vibration center previous value VCPV from the previous value holding section 423 after setting "the predetermined amplitude" by increasing or decreasing "the predetermined amplitude" that is preset depending on the current command value Iref from the current command value determining section 108 by means of the amplitude window judging section 522.

In the case of judging that the motor angular velocity ω is within the amplitude window by the amplitude window judging process, the amplitude window judging section 522 outputs the output ICO of the inverse characteristic filter 421 as the vibration center value VCV. In the case of judging that the motor angular velocity ω is outside the amplitude window by the amplitude window judging process, the amplitude window judging section 522 outputs a value obtained by adding "the predetermined amplitude" to the motor angular velocity ω or subtracting "the predetermined amplitude" from the motor angular velocity ω as the vibration center value VCV.

Further, the amplitude window judging section 522 outputs the vibration center value VCV from the amplitude window judging section 522 to both the subtracting section 410 and the previous value holding section 423. The previous value holding section 423 holds the inputted vibration center value VCV as the vibration center previous value VCPV.

Here, "the amplitude window" called in the amplitude window judging section 522 means a range being the vibration center previous value VCPV±"the predetermined amplitude", and the above "the predetermined amplitude" is obtained (set) by increasing or decreasing "the predetermined amplitude" that is preset depending on the current command value Iref.

Figure 13:
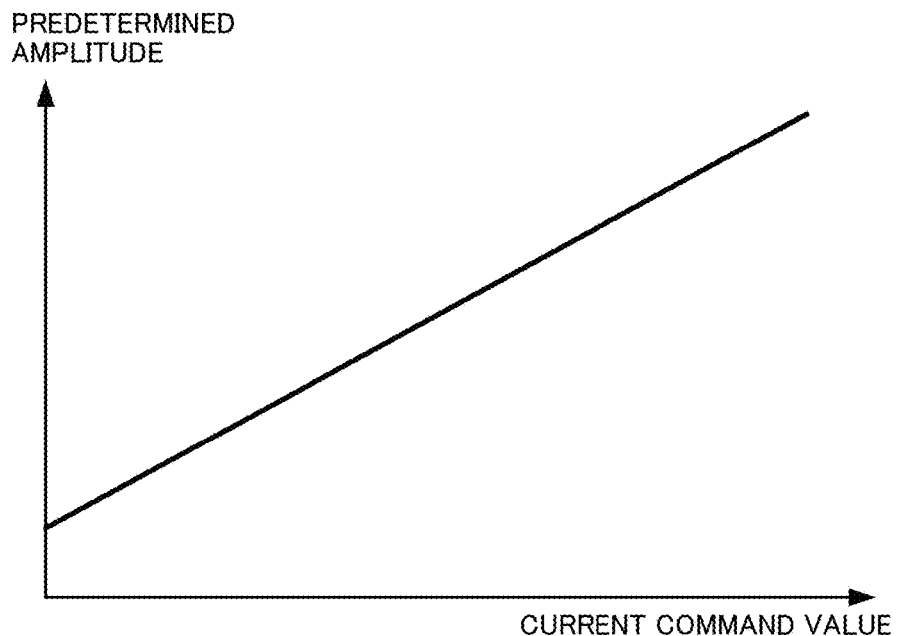
FIG. 13 is a diagram showing a variable amplitude setting example that varies a predetermined amplitude depending on a current command value in a vibration extracting filter of the second embodiment of the electric power steering apparatus according to the present invention.

FIG. 13 shows a variable amplitude setting example that the amplitude window judging section 522 varies the predetermined amplitude depending on the current command value Iref in the extraction inverse characteristic filter with window 520 of the second embodiment. The amplitude window judging section 522, for example, sets the predetermined amplitude so as to increase the predetermined amplitude depending on an increase in the current command value Iref as shown in FIG. 13.

Next, functions and operations of the vibration extracting section 530 will be described.

The vibration extracting section 530 extracts the vibration component VS2 having "the predetermined frequency range" based on the motor angular acceleration a from the angular acceleration calculating section 230, and the extracted vibration component VS2 having "the predetermined frequency range" is inputted into the second compensation value calculating section 310 as well as the vibration extracting filter 500.

The vibration extracting section 530 extracts the vibration component VS2 having "the predetermined frequency range" based on the motor angular acceleration a after setting "the predetermined frequency range" by changing "the predetermined frequency range" that is preset depending on the current command value Iref from the current command value determining section 108. Here, the characteristic of "the predetermined frequency range" extracted by the vibration extracting section 430 is, for example, the frequency characteristic having such a band-pass characteristic as shown in FIG. 9.

In this way, if applying the second embodiment, it becomes possible to improve the extraction accuracy of the torque ripple component and to perform the high-accuracy vibration compensation without generating an increase in the inertia feeling in the vicinity of on-center.

3. Third Embodiment

As described above, the second embodiment adopts a configuration that varies the predetermined amplitude depending on the current command value or the steering torque. However, even in the case of adopting the configuration described in the second embodiment, in order to compensate vibrations caused by motor idling, i.e. vibrations caused by such as motor's cogging torque, loss torque variation and the mechanical mechanism, even in the vicinity of a low current, there is a possibility of setting "the predetermined amplitude" that is set depending on the current command value to a certain level of value.

In this case, particularly, when a steering operation starts from the center, sometimes the viscous feeling occurs. Further, in the case of a high-speed steering, due to sampling on realization, sometimes it is impossible to extract waveforms of the vibration component with a high accuracy. Moreover, when steering at a high speed, since the vibration frequency of the torque ripple or the like becomes very high, it is difficult to be recognized as the vibration by the steering operator, therefore, it is also considered that the need for performing compensation itself disappears with respect to such a vibration.

In order to solve these problems, a third embodiment calculates sensitive gains for changing a proportion of vibration suppression compensation depending on an electric power steering state parameter relating to motor current amount and an electric power steering state parameter relating to velocity, and obtains the vibration suppression compensation values CV1 and CV2 by multiplying a vibration suppression compensation value CV0 calculated based on the vibration component VS1 having "the predetermined amplitude" and "the predetermined frequency range" extracted by the vibration extracting filter by the calculated sensitive gains and by multiplying a vibration suppression compensation value calculated based on the vibration component VS2 having "the predetermined frequency range" extracted by the vibration extracting section by the calculated sensitive gains, by means of a first compensation value calculating section for calculating the vibration suppression compensation value CV1 and a second compensation value calculating section for calculating the vibration suppression compensation value CV2.

Here, the electric power steering state parameter relating to motor current amount means a signal relating to motor current amount, i.e. the steering torque or the current command value. Further, the electric power steering state parameter relating to velocity means a signal relating to velocity, i.e. the steering velocity or the motor angular velocity.

Concretely, in a state that the signal relating to motor current amount is low, i.e. in the case that the electric power steering state parameter relating to motor current amount is less than or equal to a predetermined threshold, the third embodiment suppresses the viscous feeling at the time of start of the steering operation in the vicinity of on-center by decreasing the sensitive gain concerning the signal relating to motor current amount to decrease the proportion of the vibration suppression compensation value.

Further, in the case that the signal relating to velocity indicates a high rotational velocity, i.e. in the case that the electric power steering state parameter relating to velocity is more than or equal to a predetermined threshold, the third embodiment softens the effect caused by degradation of extraction accuracy of the vibration waveform by decreasing the sensitive gain concerning the signal relating to velocity to decrease the proportion of the vibration suppression compensation value.

That is, when the signal relating to velocity (the steering velocity, the motor angular velocity, or the motor angular acceleration) becomes high, the vibration frequency of the torque ripple or the like becomes high. With a relation to a sampling time, since the extraction accuracy of the vibration waveform degrades when the vibration frequency becomes high, therefore, the accuracy of the vibration compensation degrades, and conversely, there is a possibility of generating an unintended ripple and the steering uncomfortable feeling.

However, since the third embodiment increases or decreases the proportion of compensation depending on the signal relating to velocity (the steering velocity, the motor angular velocity, or the motor angular acceleration), it is possible to avoid the above problem by decreasing the vibration suppression compensation value before the accuracy degradation of the vibration compensation.

Hereinafter, the electric power steering apparatus in the case of using the current command value as the electric power steering state parameter relating to motor current amount and using the motor angular velocity as the electric power steering state parameter relating to velocity, will be described.

Figure 14:
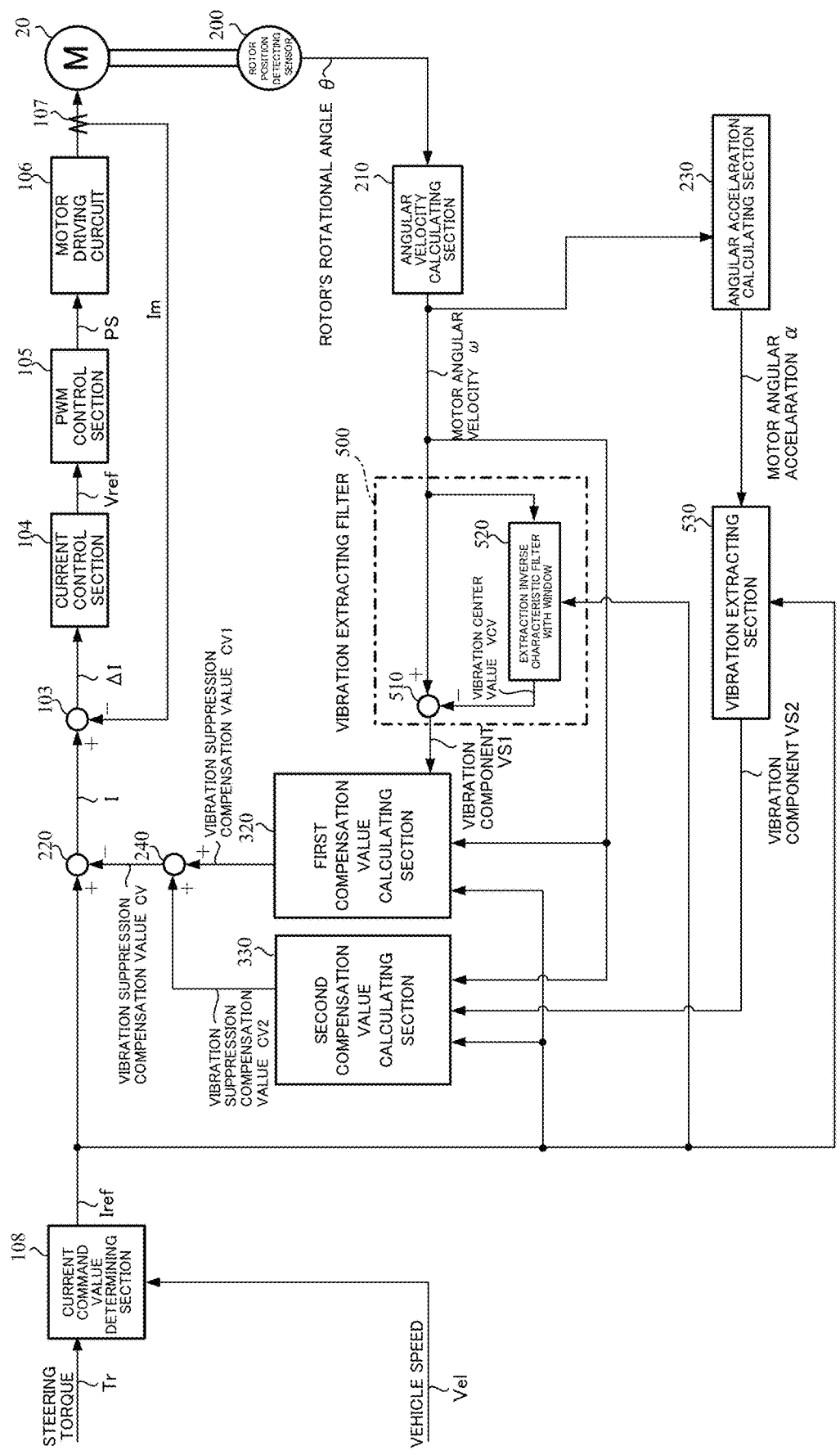
FIG. 14 is a block diagram showing a configuration example of a third embodiment of the electric power steering apparatus according to the present invention.

FIG. 14 is a block diagram showing a configuration example of the third embodiment according to the present invention, the portion of the electric power steering apparatus is shown as corresponding to FIGS. 1 and 2, and with respect to identical configurations, identical reference numerals are given without adding explanations.

Since the configuration of the electric power steering apparatus according to the third embodiment shown in FIG. 14 is the same as the configuration of the electric power steering apparatus according to the second embodiment shown in FIG. 11 except the first compensation value calculating section 320 and the second compensation value calculating section 330, explanations about identical configurations are omitted.

Figure 15:
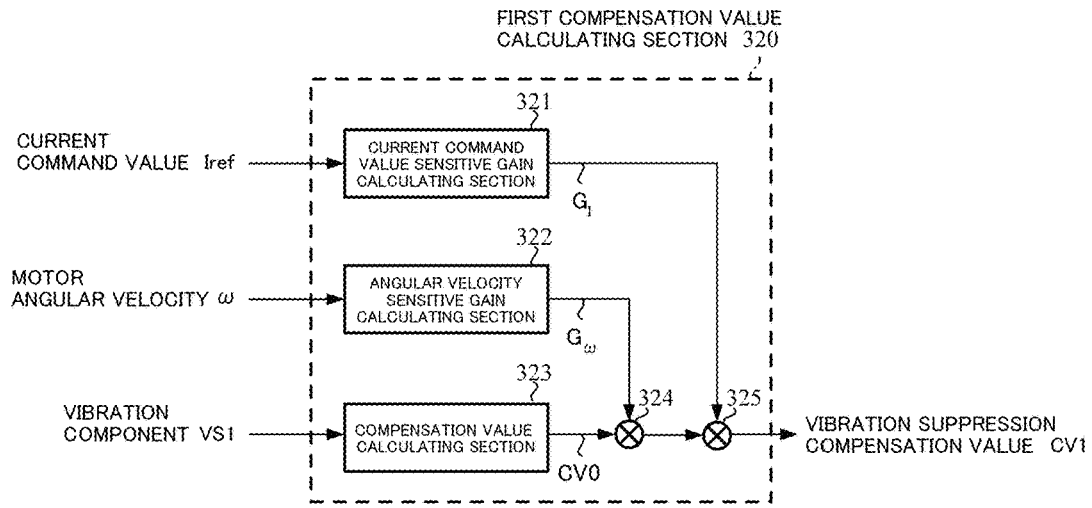
FIG. 15 is a block diagram showing a configuration example of a first compensation value calculating section of the third embodiment of the electric power steering apparatus according to the present invention.
Figure 16A:
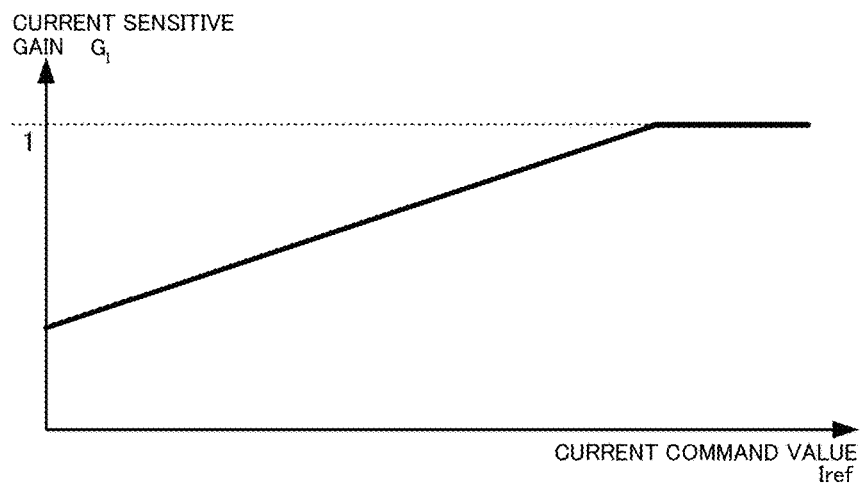
FIG. 16A is a diagram showing a current sensitive gain setting example and FIG. 16B is a diagram showing an angular velocity sensitive gain setting example in the first compensation value calculating section of the third embodiment of the electric power steering apparatus according to the present invention.
Figure 16B:
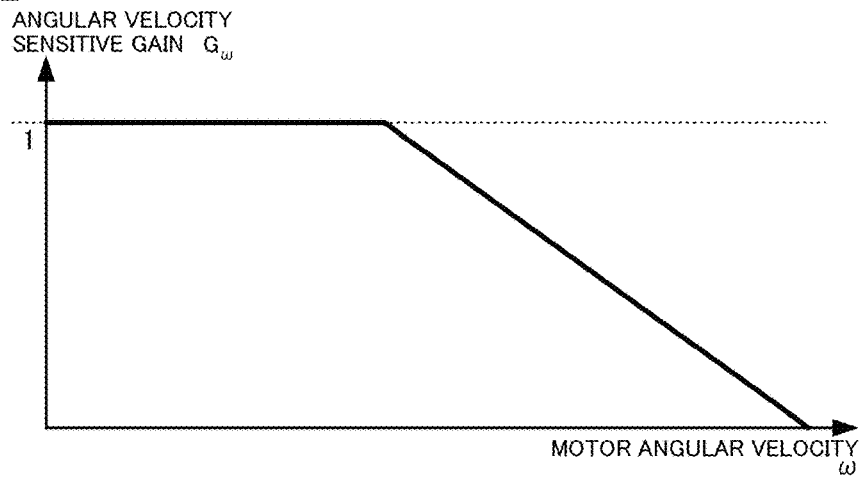

FIG. 15 is a block diagram showing a configuration example of the first compensation value calculating section 320. Further, FIG. 16A is a diagram showing a current sensitive gain setting example and FIG. 16B is a diagram showing an angular velocity sensitive gain setting example in the first compensation value calculating section 320 shown in FIG. 15. Hereinafter, with reference to FIGS. 15, 16A and 16B, functions and operations of the first compensation value calculating section 320 will be described.

As shown in FIG. 15, the first compensation value calculating section 320 comprises a current command value sensitive gain calculating section 321, an angular velocity sensitive gain calculating section 322, a compensation value calculating section 323, a multiplying section 324 and a multiplying section 325. Processes (operations) performed by the first compensation value calculating section 320 are as follows.

At first, the first compensation value calculating section 320 calculates a current command value sensitive gain $G_I$ based on the current command value Iref from the current command value determining section 108 by means of the current command value sensitive gain calculating section 321, calculates an angular velocity sensitive gain $G_\omega$ based on the motor angular velocity ω from the angular velocity calculating section 210 by means of the angular velocity sensitive gain calculating section 322, and calculates the vibration suppression compensation value CV0 based on the vibration component VS1 extracted by the vibration extracting filter 500 by means of the compensation value calculating section 323.

Here, it is possible that the current command value sensitive gain calculating section 321 calculates the current command value sensitive gain $G_I$ corresponding to the current command value Iref based on such as the current sensitive gain setting example shown in FIG. 16A.

Further, it is possible that the angular velocity sensitive gain calculating section 322 calculates the angular velocity sensitive gain $G_\omega$, corresponding to the motor angular velocity ω based on such as the angular velocity sensitive gain setting example shown in FIG. 16B. Moreover, since the configuration of the compensation value calculating section 323 is the same as the configuration of the first compensation value calculating section 300 of the first embodiment, explanations about the compensation value calculating section 323 are omitted. Further, the compensation value calculated by the first compensation value calculating section 300 of the first embodiment is regarded as the vibration suppression compensation value CV1, whereas the compensation value calculated by the compensation value calculating section 323 of the third embodiment is regarded as the vibration suppression compensation value CV0.

Next, the first compensation value calculating section 320 obtains the vibration suppression compensation value CV1 by multiplying the vibration suppression compensation value CV0 by the current command value sensitive gain $G_I$ and the angular velocity sensitive gain $G_\omega$ by means of the multiplying section 324 and the multiplying section 325.

Here, the vibration suppression compensation value CV1 calculated by the first compensation value calculating section 320 is inputted into the adding section 240. Since the configuration of the second compensation value calculating section 330 is the same as the configuration of the first compensation value calculating section 320, explanations about the second compensation value calculating section 330 are omitted.

In this way, if applying the third embodiment, it is possible to suppress the viscous feeling at the time of start of the steering operation in the vicinity of on-center that occurs in the state that the signal relating to motor current amount is low, and simultaneously it is also possible to resolve the effect caused by degradation of extraction accuracy of the vibration waveform that occurs in the case that the signal relating to velocity indicates a high rotational velocity.

4. Fourth Embodiment

Generally, in the electric power steering apparatus, when the vehicle speed becomes high, the amplitude of the vibration component to desire to suppress tends to increase. On the contrary, in the vibration extracting filter of the present invention, if the value of "the predetermined amplitude" that is preset to the amplitude window judging section of the extraction inverse characteristic filter with window is insufficient, there are cases where it is impossible to expect the vibration suppression effect.

In order to solve such a problem, a fourth embodiment sets an optimum value of "the predetermined amplitude" coordinated with vibration components varying depending on the vehicle speed by varying the value of "the predetermined amplitude" that is preset to the amplitude window judging section in extracting the vibration component depending on the vehicle speed. Further, the fourth embodiment sets an optimum value of "the predetermined frequency range" coordinated with vibration components varying depending on the vehicle speed by also varying the value of "the predetermined frequency range" that is preset to the vibration extracting section in extracting the vibration component depending on the vehicle speed.

A setting example of varying the value of "the predetermined amplitude" depending on the vehicle speed, sets "the predetermined amplitude" so as to increase "the predetermined amplitude" as the vehicle speed becomes high.

Further, in the fourth embodiment, it is also possible to vary the proportion of the vibration suppression compensation depending on the vehicle speed. In this way, it is possible to increase the vibration suppression effect with respect to an amplitude change of the vibration component that changes depending on the vehicle speed.

That is, in the electric power steering apparatus, since the amplitude of the vibration component to aim to compensate such as the eigenvalue vibration also tends to increase when the vehicle speed is high, the fourth embodiment changes the value of "the predetermined amplitude" that is preset to the amplitude window judging section and the value of "the predetermined frequency range" that is preset to the vibration extracting section depending on the vehicle speed in extracting the vibration component, and also increases or decreases a vehicle speed sensitive gain for changing the proportion of the vibration suppression compensation depending on the vehicle speed in calculating the vibration suppression compensation values CV1 and CV2 depending on the extracted vibration component.

Further, since the steering operator frequently performs the micro steering in the vicinity of on-center when the vehicle speed becomes high, sometimes it becomes easy to feel the inertia feeling in applying the first embodiment, the second embodiment or the third embodiment.

In order to solve such a problem, in the fourth embodiment, it is also possible to set not only the proportion of the vibration suppression compensation but also the predetermined amplitude small when the vehicle speed is high.

Hereinafter, the electric power steering apparatus in the case of using the current command value as the electric power steering state parameter relating to motor current amount and using the motor angular velocity as the electric power steering state parameter relating to velocity, will be described.

Figure 17:
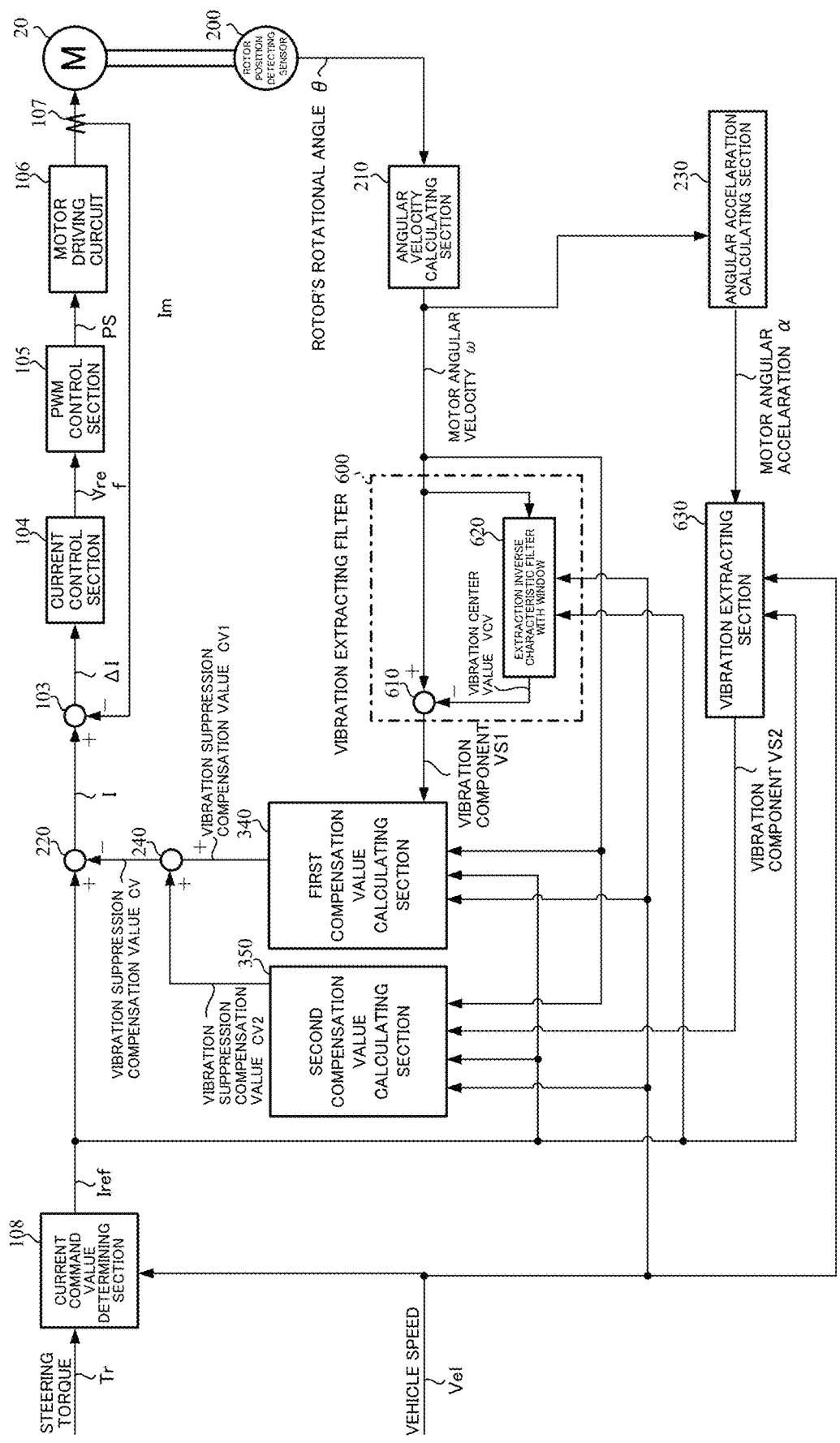
FIG. 17 is a block diagram showing a configuration example of a fourth embodiment of the electric power steering apparatus according to the present invention.
Figure 18:
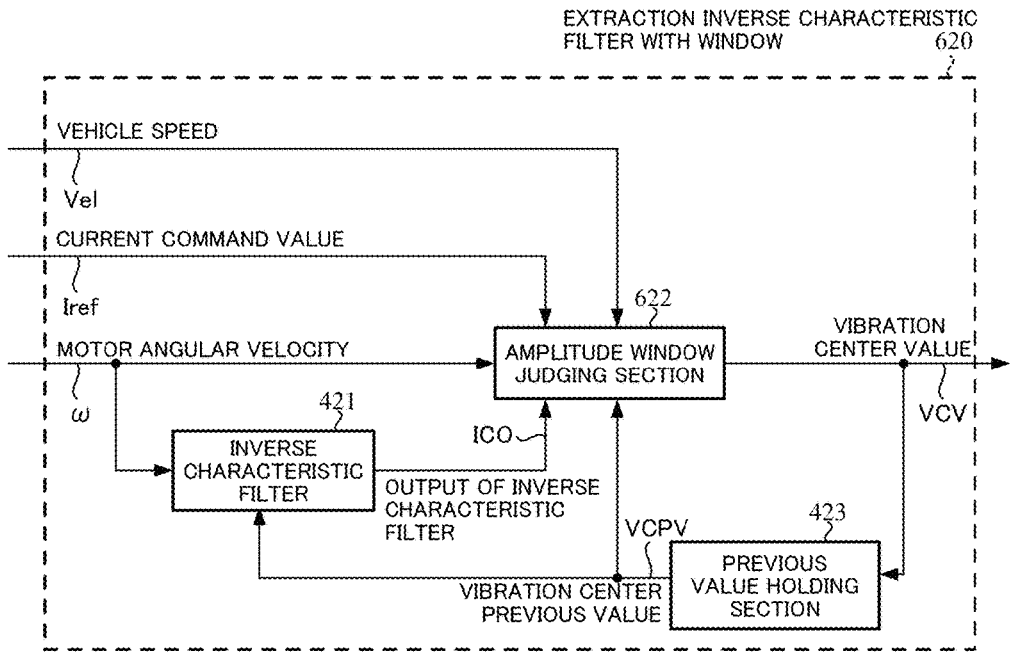
FIG. 18 is a block diagram showing a configuration example of an extraction inverse characteristic filter with window in the fourth embodiment of the electric power steering apparatus according to the present invention.
Figure 19:
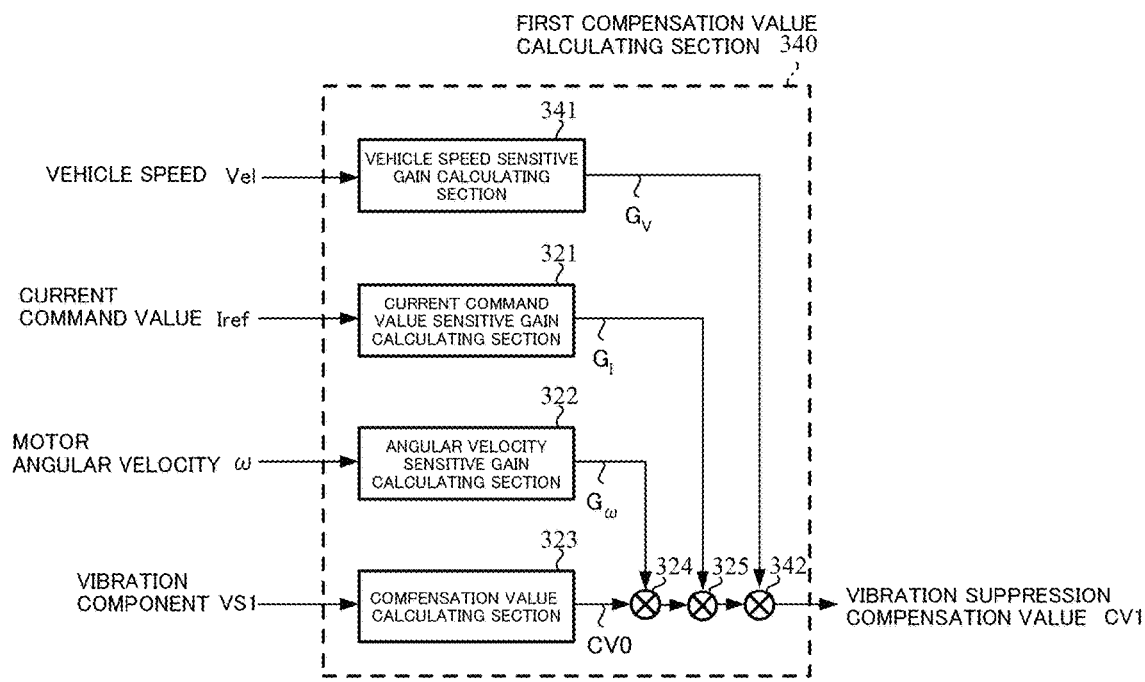
FIG. 19 is a block diagram showing a configuration example of the first compensation value calculating section of the fourth embodiment of the electric power steering apparatus according to the present invention.

FIG. 17 is a block diagram showing a configuration example of the fourth embodiment of the electric power steering apparatus according to the present invention, the portion of the electric power steering apparatus is shown as corresponding to FIGS. 1 and 2, and with respect to identical configurations, identical reference numerals are given without adding explanations. Further, FIG. 18 is a block diagram showing a configuration example of an extraction inverse characteristic filter with window 620 in the fourth embodiment. FIG. 19 is a block diagram showing a configuration example of a first compensation value calculating section 340 of the fourth embodiment.

With reference to FIGS. 17, 18 and 19, functions and the whole operation of the electric power steering apparatus according to the fourth embodiment of the present invention will be described in detail.

As shown in FIG. 17, a current command value determining section 108 determines a current command value Iref based on a steering torque Tr detected by the torque sensor 10 and a vehicle speed Vel detected by the vehicle speed sensor 12. The determined current command value Iref is inputted into a subtracting section 220.

Meanwhile, a motor current Im being applied to a motor 20 is detected by a motor current detecting circuit 107, and the detected motor current Im is inputted into a subtracting section 103.

Further, a rotor's rotational angle θ being a rotor position signal is detected by a rotor position detecting sensor 200 for detecting a rotor position of the motor 20. An angular velocity calculating section 210 calculates a motor angular velocity ω based on the rotor's rotational angle θ detected by the rotor position detecting sensor 200. An angular acceleration calculating section 230 calculates a motor angular acceleration a based on the motor angular velocity ω. Then, the motor angular velocity ω calculated by the angular velocity calculating section 210 is inputted into a vibration extracting filter 600, and the motor angular acceleration a calculated by the angular acceleration calculating section 230 is inputted into a vibration extracting section 630.

The vibration extracting filter 600 extracts a vibration component having a predetermined amplitude and a predetermined frequency range based on the inputted motor angular velocity ω, the current command value Iref and the vehicle speed Vel, and the extracted vibration component VS1 is inputted into a first compensation value calculating section 340. The vibration extracting section 630 extracts a vibration component having a predetermined frequency range based on the inputted motor angular acceleration a, the current command value Iref and the vehicle speed Vel, and the extracted vibration component VS2 is inputted into a second compensation value calculating section 350.

The first compensation value calculating section 340 calculates a vibration suppression compensation value CV1 based on the vibration component VS1, the motor angular velocity ω, the current command value Iref and the vehicle speed Vel, and the calculated vibration suppression compensation value CV1 is inputted into an adding section 240. The second compensation value calculating section 350 calculates a vibration suppression compensation value CV2 based on the vibration component VS2, the motor angular velocity ω, the current command value Iref and the vehicle speed Vel, and the calculated vibration suppression compensation value CV2 is also inputted into the adding section 240.

Then, a vibration-compensated current command value I is calculated by subtracting the vibration suppression compensation value CV (=CV1+CV2) obtained by addition of the adding section 240 from the current command value Iref in the subtracting section 220, that is, by being configured so as to feedback the vibration suppression compensation value CV to the current command value Iref. The calculated current command value I is inputted into a subtracting section 103.

Then, the subtracting section 103 obtains a deviation ΔI (=I−Im) between the vibration-compensated current command value I and the motor current Im of the motor 20 being fed back, the obtained deviation ΔI is controlled by a current control section 104, a controlled voltage control command value Vref is inputted into a PWM control section 105 so as to calculate a duty ratio, and the motor 20 is driven through a motor driving circuit 106 by a PWM signal PS of which the duty ratio is calculated.

Here, functions and operations of the vibration extracting filter 600 will be described.

As shown in FIG. 17, the vibration extracting filter 600 comprises a subtracting section 610 and the extraction inverse characteristic filter with window 620. Processes (operations) performed by the vibration extracting filter 600 are as follows.

At first, the vibration extracting filter 600 extracts a vibration component having an inverse characteristic of "the predetermined amplitude" and "the predetermined frequency range" based on the motor angular velocity ω from the angular velocity calculating section 210 by also using the current command value Iref and the vehicle speed Vel by means of the extraction inverse characteristic filter with window 620. The vibration component having the inverse characteristic of "the predetermined amplitude" and "the predetermined frequency range" is outputted from the extraction inverse characteristic filter with window 620 as a vibration center value VCV.

Next, the vibration extracting filter 600 extracts the vibration component VS1 having "the predetermined amplitude" and "the predetermined frequency range" by calculating a difference between the vibration component having the inverse characteristic of "the predetermined amplitude" and "the predetermined frequency range" (the vibration center value VCV) and the motor angular velocity ω by means of the subtracting section 610. The vibration component VS1 having "the predetermined amplitude" and "the predetermined frequency range" extracted by the vibration extracting filter 600 is inputted into the first compensation value calculating section 340.

Since "the inverse characteristic" called in the fourth embodiment is the same as "the inverse characteristic" called in the first embodiment, explanations about "the inverse characteristic" called in the fourth embodiment are omitted.

Based on FIG. 18, functions and operations of the extraction inverse characteristic filter with window 620 of the fourth embodiment will be described.

As shown in FIG. 18, the extraction inverse characteristic filter with window 620 comprises an inverse characteristic filter 421 that has the inverse characteristic of "the predetermined frequency range", an amplitude window judging section 622 that comprises a means of increasing or decreasing "the predetermined amplitude" that is preset depending on the current command value and the vehicle speed, and a previous value holding section 423 that holds a vibration center previous value.

With respect to the inputted motor angular velocity ω, processes (operations) performed by the extraction inverse characteristic filter with window 620 are as follows.

At first, the extraction inverse characteristic filter with window 620 inputs the motor angular velocity ω to the inverse characteristic filter 421, and outputs an output ICO of the inverse characteristic filter 421 to the amplitude window judging section 622. Here, the inverse characteristic of "the predetermined frequency" that the inverse characteristic filter 421 has, is the inverse characteristic of frequency characteristic that the present invention aims to extract shown in such as FIG. 5B.

Next, the extraction inverse characteristic filter with window 620 performs an amplitude window judging process that judges whether the motor angular velocity ω is within an amplitude window or not based on the motor angular velocity ω, the output ICO of the inverse characteristic filter 421, and a vibration center previous value VCPV from the previous value holding section 423 after setting "the predetermined amplitude" by increasing or decreasing "the predetermined amplitude" that is preset depending on the current command value Iref from the current command value determining section 108 and the vehicle speed Vel by means of the amplitude window judging section 622.

In the case of judging that the motor angular velocity ω is within the amplitude window by the amplitude window judging process, the amplitude window judging section 622 outputs the output ICO of the inverse characteristic filter 421 as the vibration center value VCV. In the case of judging that the motor angular velocity ω is outside the amplitude window by the amplitude window judging process, the amplitude window judging section 622 outputs a value obtained by adding "the predetermined amplitude" to the motor angular velocity ω or subtracting "the predetermined amplitude" from the motor angular velocity ω as the vibration center value VCV.

Further, the amplitude window judging section 622 outputs the vibration center value VCV from the amplitude window judging section 622 to both the subtracting section 610 and the previous value holding section 423. The previous value holding section 423 holds the inputted vibration center value VCV as the vibration center previous value VCPV.

Here, "the amplitude window" called in the amplitude window judging section 622 means a range being the vibration center previous value VCPV±"the predetermined amplitude", and the above "the predetermined amplitude" is obtained (set) by increasing or decreasing "the predetermined amplitude" that is preset depending on the current command value Iref and the vehicle speed Vel.

In this way, in the fourth embodiment, by means of the vibration extracting filter 600, it is possible to extract the vibration component having the predetermined amplitude and the predetermined frequency range.

Next, functions and operations of the vibration extracting section 630 will be described.

The vibration extracting section 630 extracts the vibration component VS2 having "the predetermined frequency range" based on the motor angular acceleration a from the angular acceleration calculating section 230 by also using the current command value Iref and the vehicle speed Vel, and the extracted vibration component VS2 having "the predetermined frequency range" is inputted into the second compensation value calculating section 350 as well as the vibration extracting filter 600.

The vibration extracting section 630 extracts the vibration component VS2 having "the predetermined frequency range" based on the motor angular acceleration a after setting "the predetermined frequency range" by changing "the predetermined frequency range" that is preset depending on the current command value Iref from the current command value determining section 108 and the vehicle speed Vel. Here, the characteristic of "the predetermined frequency range" extracted by the vibration extracting section 630 is, for example, the frequency characteristic having such a band-pass characteristic as shown in FIG. 9.

In this way, in the fourth embodiment, by means of the vibration extracting section 630, it is possible to extract the vibration component having the predetermined frequency range.

Hereinafter, with reference to FIG. 19, functions and operations of the first compensation value calculating section 340 will be described.

As shown in FIG. 19, the first compensation value calculating section 340 comprises a vehicle speed sensitive gain calculating section 341, a current command value sensitive gain calculating section 321, an angular velocity sensitive gain calculating section 322, a compensation value calculating section 323, a multiplying section 324, a multiplying section 325 and a multiplying section 342. Processes (operations) performed by the first compensation value calculating section 340 are as follows.

At first, the first compensation value calculating section 340 calculates a vehicle speed sensitive gain $G_V$ based on the vehicle speed Vel by means of the vehicle speed sensitive gain calculating section 341, calculates a current command value sensitive gain $G_I$ based on the current command value Iref from the current command value determining section 108 by means of the current command value sensitive gain calculating section 321, calculates an angular velocity sensitive gain $G_\omega$ based on the motor angular velocity ω from the angular velocity calculating section 210 by means of the angular velocity sensitive gain calculating section 322, and calculates the vibration suppression compensation value CV0 based on the vibration component VS1 extracted by the vibration extracting filter 600 by means of the compensation value calculating section 323.

Moreover, since the configuration of the compensation value calculating section 323 is the same as the configuration of the first compensation value calculating section 300 of the first embodiment, explanations about the compensation value calculating section 323 are omitted. Further, the compensation value calculated by the first compensation value calculating section 300 of the first embodiment is regarded as the vibration suppression compensation value CV1, whereas the compensation value calculated by the compensation value calculating section 323 of the fourth embodiment is regarded as the vibration suppression compensation value CV0.

Next, the first compensation value calculating section 340 obtains the vibration suppression compensation value CV1 by multiplying the vibration suppression compensation value CV0 by the angular velocity sensitive gain $G_\omega$, the current command value sensitive gain $G_I$ and the vehicle speed sensitive gain $G_V$ by means of the multiplying section 324, the multiplying section 325 and the multiplying section 342. Here, the vibration suppression compensation value CV1 calculated by the first compensation value calculating section 340 is inputted into the adding section 240.

Since the configuration of the second compensation value calculating section 350 is the same as the configuration of the first compensation value calculating section 340, explanations about the second compensation value calculating section 350 are omitted.

In this way, if applying the fourth embodiment, since varying not only the predetermined amplitude and the predetermined frequency range but also the proportion of the vibration suppression compensation depending on the vehicle speed, it is possible to increase the vibration suppression effect with respect to the amplitude change of the vibration component that changes depending on the vehicle speed, and it is also possible to resolve the inertia feeling caused by the micro steering in the vicinity of on-center that is frequently performed.

Furthermore, although the above-described embodiments (the first embodiment, the second embodiment, the third embodiment and the fourth embodiment) extract the vibration component having the predetermined frequency range based on the motor angular acceleration by means of the vibration extracting section, it is possible to omit the extraction of the vibration component having the predetermined frequency range performed by the vibration extracting section in the present invention as needed. For example, when an uncomfortable feeling in steering that occurs by omitting the extraction of the vibration component having the predetermined frequency range is allowable in accordance with a difference of a system configuration or the like, it is possible to omit the extraction of the vibration component having the predetermined frequency range performed by the vibration extracting section in order to reduce microcomputer resources. When omitting the extraction of the vibration component having the predetermined frequency range performed by the vibration extracting section, the vibration extracting section is eliminated, and the motor angular acceleration a calculated by the angular acceleration calculating section is inputted into the second compensation value calculating section instead of the vibration component VS2.

EXPLANATION OF REFERENCE NUMERALS 1 steering wheel
10 torque sensor
12 vehicle speed sensor
13 battery
20 motor
30 control unit
101 current command value calculating section
102 maximum output limiting section
103 subtracting section
104 current control section
105 PWM control section
106 motor driving circuit
107 motor current detecting circuit
108 current command value determining section
200 rotor position detecting sensor
210 angular velocity calculating section
220 subtracting section
230 angular acceleration calculating section
240 adding section
300, 320, 340 first compensation value calculating section
310, 330, 350 second compensation value calculating section
321 current command value sensitive gain calculating section
322 angular velocity sensitive gain calculating section
323 compensation value calculating section
324, 325, 342 multiplying section
341 vehicle speed sensitive gain calculating section
400, 500, 600 vibration extracting filter
410, 510, 610 subtracting section
420, 520, 620 extraction inverse characteristic filter with window
421 inverse characteristic filter
422, 522, 622 amplitude window judging section
423 previous value holding section
430, 530, 630 vibration extracting section

The invention claimed is:

1. An electric power steering apparatus that provides a steering system of a vehicle with an assist force generated by a motor, comprising:
   a current command value determining section that determines a current command value based on a steering torque and a vehicle speed;
   a vibration extracting filter that extracts a first vibration component having a predetermined amplitude and a first predetermined frequency range depending on a motor angular velocity;
   a vibration extracting section that extracts a second vibration component having a second predetermined frequency range depending on a motor angular acceleration;
   a first compensation value calculating section that calculates a first vibration suppression compensation value based on said first vibration component extracted by said vibration extracting filter; and
   a second compensation value calculating section that calculates a second vibration suppression compensation value based on said second vibration component extracted by said vibration extracting section;
   wherein vibrations of said motor are suppressed by feeding back said first vibration suppression compensation value calculated by said first compensation value calculating section and said second vibration suppression compensation value calculated by said second compensation value calculating section to said current command value determined by said current command value determining section;
   wherein said vibration extracting filter comprises an extraction inverse characteristic filter with window that calculates a vibration center value based on said motor angular velocity and depending on an inverse characteristic of said first predetermined frequency range, and extracts said first vibration component having said predetermined amplitude and said first predetermined frequency range based on a difference between said vibration center value and said motor angular velocity;
   wherein said extraction inverse characteristic filter with window comprises an inverse characteristic filter that has said inverse characteristic of said first predetermined frequency range and an amplitude window judging section where said predetermined amplitude is preset;
   wherein said extraction inverse characteristic filter with window inputs said motor angular velocity to said inverse characteristic filter, and then outputs an output of said inverse characteristic filter to said amplitude window judging section;
   wherein said amplitude window judging section performs an amplitude window judging process that judges whether said motor angular velocity is within an amplitude window being a previous value of said vibration center value± said predetermined amplitude or not based on said motor angular velocity, said output of said inverse characteristic filter and said previous value of said vibration center value,
   in a case of judging that said motor angular velocity is within said amplitude window, outputs said output of said inverse characteristic filter as said vibration center value, and
   in a case of judging that said motor angular velocity is outside said amplitude window, outputs a value obtained by adding said predetermined amplitude to said motor angular velocity or subtracting said predetermined amplitude from said motor angular velocity as said vibration center value.

2. The electric power steering apparatus according to claim 1, wherein said first predetermined frequency range is a frequency range except vibration components of a frequency range that said electric power steering apparatus aims to transmit to a steering operator.

3. The electric power steering apparatus according to claim 2, wherein said frequency range that said electric power steering apparatus aims to transmit to said steering operator is a frequency range being less than or equal to about 10 [Hz] that road surface information, tire conditions are included in.

4. The electric power steering apparatus according to claim 1, wherein said first predetermined frequency range is a frequency range except a frequency range that said electric power steering apparatus aims to transmit to a steering operator and a frequency range being more than or equal to a frequency limited by sampling and so on where vibration extraction accuracy becomes worse.

5. The electric power steering apparatus according to claim 4, wherein said frequency range that said electric power steering apparatus aims to transmit to said steering operator is a frequency range being less than or equal to about 10 [Hz] that road surface information, tire conditions are included in.

6. The electric power steering apparatus according claim 4, wherein said frequency range being more than or equal to said frequency limited by sampling where said vibration extraction accuracy becomes worse is a frequency range being more than or equal to about 50 [Hz].

7. The electric power steering apparatus according to claim 1, wherein said second predetermined frequency range is a frequency range except vibration components of a frequency range that said electric power steering apparatus aims to transmit to a steering operator.

8. The electric power steering apparatus according to claim 7, wherein said frequency range that said electric power steering apparatus aims to transmit to said steering operator is a frequency range being less than or equal to about 10 [Hz] that road surface information, tire conditions are included in.

9. The electric power steering apparatus according to claim 1, wherein said second predetermined frequency range is a frequency range except a frequency range that said electric power steering apparatus aims to transmit to a steering operator and a frequency range being more than or equal to a frequency limited by sampling where vibration extraction accuracy becomes worse.

10. The electric power steering apparatus according to claim 9, wherein said frequency range that said electric power steering apparatus aims to transmit to said steering operator is a frequency range being less than or equal to about 10 [Hz] that road surface information, tire conditions are included in.

11. The electric power steering apparatus according claim 9, wherein said frequency range being more than or equal to said frequency limited by sampling where said vibration extraction accuracy becomes worse is a frequency range being more than or equal to about 50 [Hz].

* * * * *